US008323110B2

(12) United States Patent
Shibamiya et al.

(10) Patent No.: US 8,323,110 B2
(45) Date of Patent: Dec. 4, 2012

(54) GAME SYSTEM, GAME MANAGEMENT PROGRAM, AND GAME MANAGEMENT METHOD FOR GAME SYSTEM

(75) Inventors: Masakazu Shibamiya, Kobe (JP); Kazuhide Kubo, Akashi (JP); Kazuma Konishi, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 12/735,104

(22) PCT Filed: Dec. 16, 2008

(86) PCT No.: PCT/JP2008/072861
§ 371 (c)(1),
(2), (4) Date: Jun. 16, 2010

(87) PCT Pub. No.: WO2009/078404
PCT Pub. Date: Jun. 25, 2009

(65) Prior Publication Data
US 2010/0261536 A1    Oct. 14, 2010

(30) Foreign Application Priority Data

Dec. 17, 2007  (JP) ................................. 2007-324951

(51) Int. Cl.
*A63F 13/00* (2006.01)
(52) U.S. Cl. ................. 463/42; 463/29; 463/30; 463/40
(58) Field of Classification Search ............... 463/29, 463/30, 40, 42
See application file for complete search history.

(56) References Cited

U.S. PATENT DOCUMENTS

| 6,623,360 | B1 | 9/2003 | Nakajima |
| 6,839,435 | B1 | 1/2005 | Iijima et al. |
| 2002/0115488 | A1* | 8/2002 | Berry et al. ..................... 463/42 |
| 2007/0191102 | A1* | 8/2007 | Coliz et al. ..................... 463/42 |

FOREIGN PATENT DOCUMENTS

| JP | 2000-000376 | 1/2000 |
| JP | 2000-042253 | 2/2000 |
| JP | 2000-051523 | 2/2000 |
| JP | 2000-237450 | 9/2000 |
| JP | 2006-026237 | 2/2006 |

* cited by examiner

*Primary Examiner* — James S McClellan
(74) *Attorney, Agent, or Firm* — Jordan and Hamburg LLP

(57) ABSTRACT

A game system is provided with a player information storage unit that stores a communication address of a communication device owned by a player, a preliminary match totaling unit that obtains a game evaluation of the player, a game history information storage unit that stores the game evaluation of each player for each game, a standard condition setting unit that sets a ranking for preliminary match passage, a monitoring unit that continuously monitors whether or not the game evaluation of each player has crossed over the standard condition, and notification means for sending, to a player for whom the monitoring means has determined according to continuous monitoring that the game evaluation has crossed over the standard condition, information to that effect to a communication device of that player. When a relative standard condition among the players has been crossed over, information to that effect is sent to the communication device of a player concerned, thereby carrying out notification processing effectively and greatly reducing server load.

3 Claims, 23 Drawing Sheets

GAME SYSTEM, GAME MANAGEMENT PROGRAM, AND GAME MANAGEMENT METHOD FOR GAME SYSTEM

TECHNICAL FIELD

The present invention relates to a game system, a game management program, and a game management method for a game system in which, by exchanging operational information that is inputted in use of operation units by players via a network, a game is advanced among a plurality of game terminals in response to the operational information, and a game result of each player in each game is managed by a server.

BACKGROUND ART

In Patent Documents 1 and 2, game devices are known that viewably post the points that players have obtained on the game devices. A server is provided in Patent Documents 1 and 2 that receives the points obtained by a player, then the server adds the received points to point ranking information, and detects points that produce a change in ranking due to being added, then sends a message by email indicating that a change in ranking has occurred to an address that indicates an email address corresponding to the points by which a change in ranking was produced. In this way, there is no need for a player to take the trouble to access the server to confirm rankings, which eliminates cumbersomeness and also achieves reductions in the load on the server.

With Patent Documents 1 and 2, although cumbersomeness is reduced for the player, in a case where a change in ranking has occurred at a higher ranking, all lower ranked players must be sent an email, and in a case where these are to be sent to a large number of tournament participants, in particular such as a game tournament or the like held in a predetermined period, emails must be sent to a large number of players and this has an opposite effect of greatly increasing the load on the server. Moreover, when games are carried out continuously during a tournament, the load on the server is further increased and results in an expansion of the volume of communications.

Patent Document 1: Japanese Patent Application Laid-open No. 2000-376
Patent Document 2: Japanese Patent Application Laid-open No. 2000-42253

DISCLOSURE OF INVENTION

The present invention has been devised in light of these issues and it is an object thereof to provide a game system, a game management program, and a game management method for a game system that are capable of effectively carrying out notification processing and capable of reducing server load.

One aspect of the present invention pertains to a game system having a plurality of game terminal devices each having an operation unit, a server that exchanges operational information inputted in use of the operation unit by players via a network to advance a game among the plurality of game terminal devices in response to the operational information, and game evaluation calculation means for carrying out a game evaluation of each player, wherein the server has: address storage means for storing a communication address, obtained from each player, of a communication device owned by each player; game result storage means for storing a game evaluation of each player; standard condition setting means for setting a relative standard condition for each player relating to the game evaluations for assigning a right and benefit in relation to a game; monitoring means for monitoring whether or not the game evaluation of each player has crossed over the standard condition; and notification means for sending, to a player for whom the monitoring means has determined according to monitoring that the game evaluation has crossed over the standard condition, information to that effect to a communication device of that player.

The above-described and other objects, features, and advantages of the present invention will become further evident from embodiments to be described with reference to the accompanying drawings.

BEST MODE FOR CARRYING OUT THE INVENTION

Figure 1:
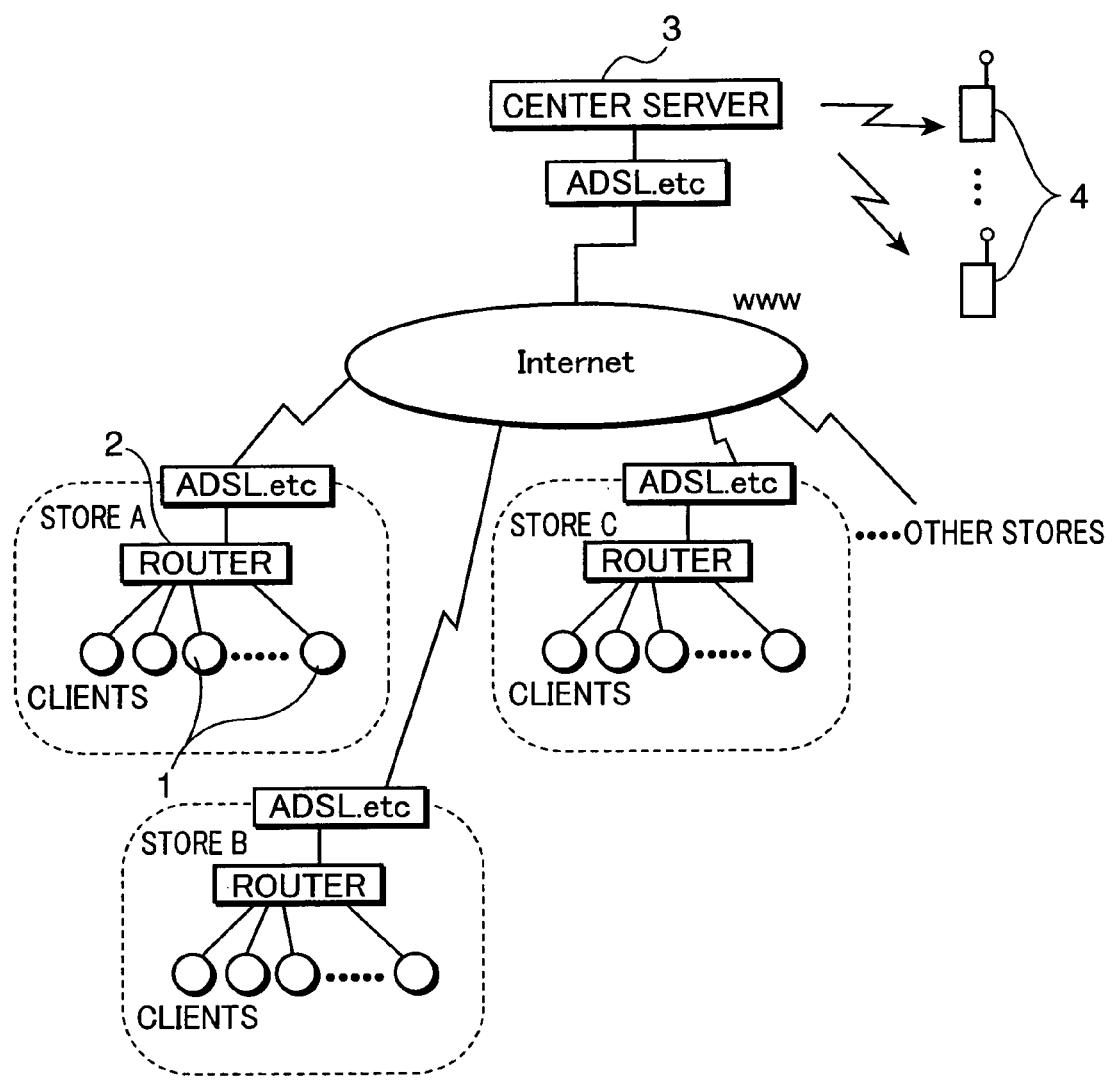
FIG. 1 is a configuration diagram showing a competitive game system according to one embodiment of the present invention.

The present game system in FIG. 1, which shows a configuration of a game system according to one embodiment of the present invention, is provided with client terminal devices (game terminal devices) 1, each associated with identification information, routers 2, which are communication devices that are communicably connected to the plurality of (here, eight) client terminal devices 1 and carry out relaying and connections among these client terminal devices as well as connections between each of the client terminal devices 1 and client terminal devices of other stores via a network (Internet), and a center server device 3 that is communicably connected via each of the routers 2 and manages information relating to player authentication, player selection, and game history for the plurality of players to carry out using the client terminal devices 1. It should be noted that in a case where a predetermined website is provided, the center server device 3 may also be able to be accessed from a mobile phone 4 as a communication device using a browser function via the Internet. In addition to the mobile phone 4, a personal computer may also be used as a communication device.

By having a player carry out predetermined operations based on game screens displayed on a monitor, the client terminal device 1 carries out advancement of a game for an individual player, but also for a game in a mode of carrying out a competitive game with another single or plurality of client terminal devices. It should be noted that the identification information associated with the client terminal devices 1 includes identification information for each router 2 to which the client terminal device 1 is connected (or identification information of the store in which the client terminal device 1 is installed), and identification information (referred to as terminal number) for each client terminal device 1 inside a store in which client terminal devices 1 are installed. For example, "A" is identification information of a store A, and in a case where the identification information of a client terminal device 1 inside the store A is "4," the identification information of this client terminal device 1 is "A4."

The routers 2 are communicably connected to their respective multiple client terminal devices 1 and the center server device 3, and carry out transmission and reception of data between the client terminal devices 1 and the center server device 3.

The center server device 3, which is communicably connected to each of the routers 2, stores player information in which a player ID is associated for specifying an individual player, and selects a player and another player (referred to as an opponent) to carry out a game in a same game space by carrying out transmission and reception of data with the client terminal devices 1 via the routers 2. Furthermore, as is described later, the center server device 3 carries out advancement and management of a game such as a game tournament or the like, which is held be calling for the participation of a large number of players as required and, as one form of the aforementioned management, carries out notifications of determination results to an email address of a mobile phone 4 of a corresponding player based on specific determination results.

Figure 2:
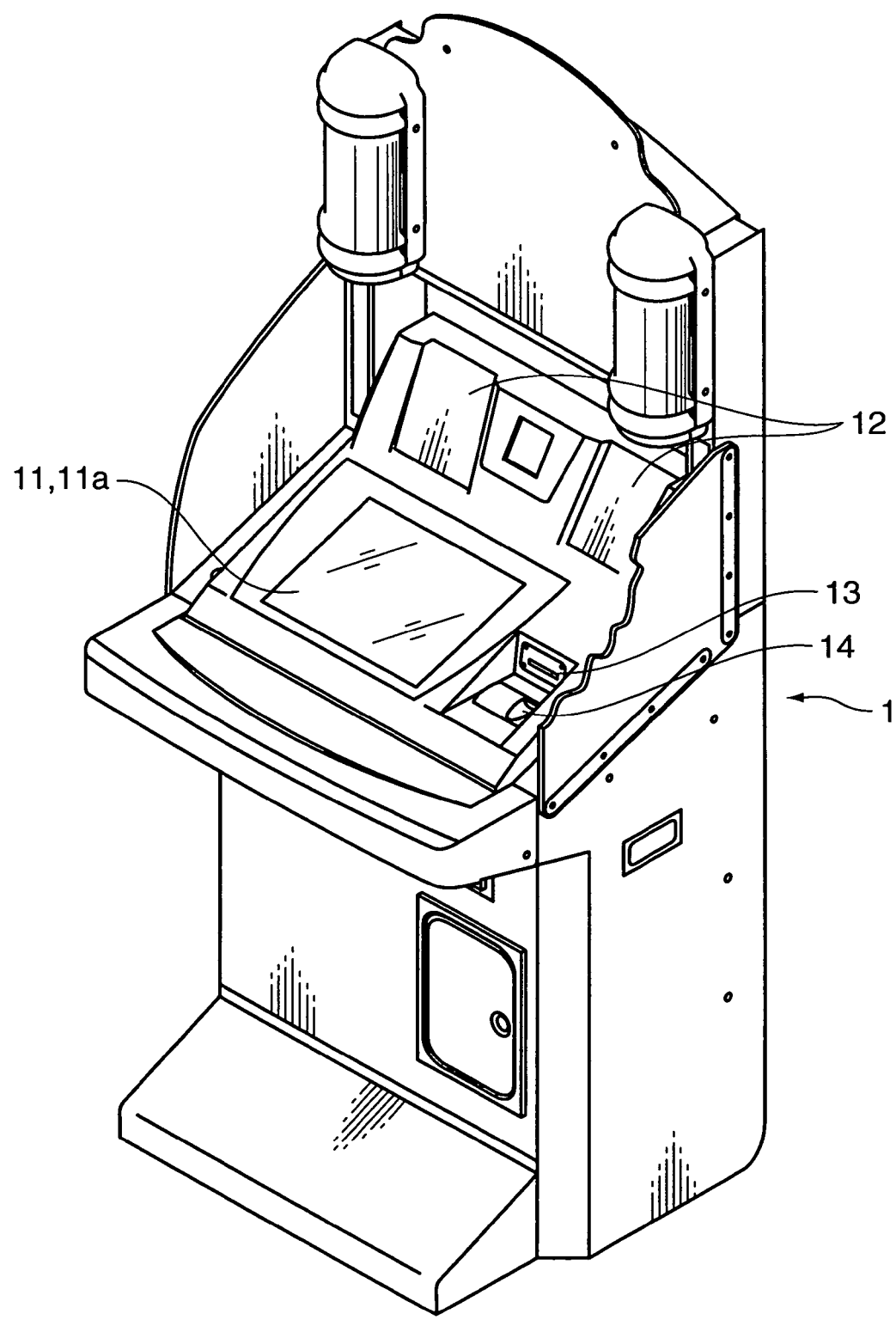
FIG. 2 is a perspective view showing an external appearance of a client terminal device provided in the competitive game system.

FIG. 2 is a perspective view showing an external appearance of a client terminal device provided in the game system. It should be noted that in the present embodiment a game carried out using the client terminal device 1 may be a competitive game and in particular a mahjong is assumed in which a player operating the client terminal device 1 competes against each player operating another three client terminal devices 1. In a case of competing against players operating other client terminal devices 1, transmission and reception of operational data is carried out in response to the content operated by each player between the client terminal devices 1 during competition via a network communication unit 18, which is described later, and the routers 2. It should be noted that it is also possible to prepare a CPU player controlled by a computer as required, and in a case where an opponent is not selected such after a selection wait under predetermined conditions such as a predetermined waiting time while selecting an opponent, the CPU player may be added to the competitive game.

The client terminal device 1 is provided with a monitor 11 on which a game screen is displayed, a touch panel 11a that determines which button has been indicated from an address of a button and a position pressed by the player prompting a selection or the like displayed on the game screen of the monitor 11, speakers 12 that output audio, a card reader 13 that reads in information such as a user ID stored on an individual card, and a coin receiving unit 14 that receives a coin inserted by the player. The monitor 11 displays various images relating to the game and may be a liquid crystal display or a plasma display or the like. Furthermore, the individual card is a magnetic card or an IC card or the like on which some individual information such as card ID and the like is stored.

A control unit 16 (see FIG. 3), which is configured by a microcomputer or the like that receives detection signals from each unit and outputs control signals to each unit, is installed in an appropriate location in the client terminal device 1.

Figure 3:
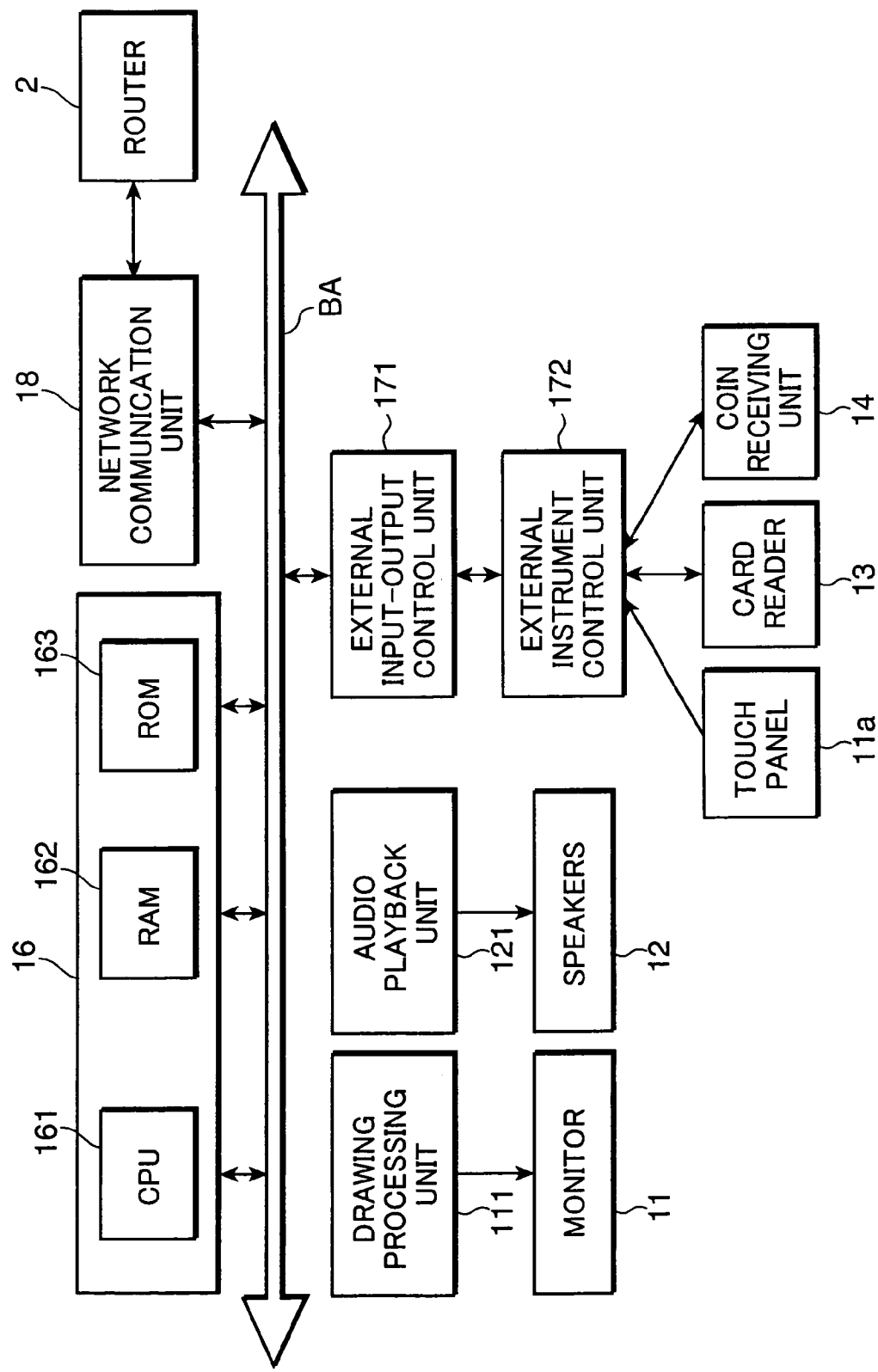
FIG. 3 is a configuration diagram showing a hardware configuration of the client terminal device.

FIG. 3 is a configuration diagram showing a hardware configuration of the client terminal device. The control unit 16 controls overall operations of the client terminal device 1 and is provided with an information processing unit (CPU) 161 that carries out processing relating to general game advancement including reception processing, image processing, and various types of information processing, a RAM 162 that temporarily stores information and the like during processing, and a ROM 163 on which is stored in advance predetermined image information and game programs and the like, which are described later.

An external input-output control unit 171 converts detection signals to digital signals for processing between the control unit 16 and detection units including the card reader 13, the touch panel 11a (operation unit), and the coin receiving unit 14, and also converts instruction information to control information for output to various instruments of the detection units, and the signal processing and input-output processing involved here is carried out in a time division manner for example. An external instrument control unit 172 carries out output operations of control signals to the various instruments of the detection units and input operations of detection signals from the various instruments of the detection units within time division periods respectively.

A drawing processing unit 111 displays required images on the monitor 11 in accordance with image display instructions from the control unit 16, and is provided with a video RAM and the like. An audio playback unit 121 outputs predetermined messages and background music and the like to the speakers 12 in accordance with instructions from the control unit 16.

Mahjong tile characters, background images, and various other images of screens are stored in the ROM 163. The mahjong tile characters and the like are configured by a required number of polygons so as to enable three-dimensional drawing thereof and, based on drawing instructions from the CPU 161, and the drawing processing unit 111 carries out calculations to convert positions in a three-dimensional space to positions in a pseudo three-dimensional space, and light source calculation processing and the like when required, then carries out writing processing based on results of the above-mentioned calculations for image data to be drawn to the video RAM, for example a writing (pasting) process of texture data to an area of the video RAM specified as a polygon. It should be noted that in a mode in which the game can be represented in a flat surface manner, for example, in a mahjong game, a mode is possible in which the mahjong tile characters or the like are constituted using two-dimensional rendering.

Here, description is given of a relationship between operations of the CPU 161 and operations of the drawing processing unit 111. Based on an operating system (OS) recorded on the detachable ROM 163 with an image display processing unit that carries out output and display of image information to the monitor 11 internally or externally, the CPU 161 reads out images, audio, control program data, and game program data from the ROM 163. A portion or all of the images, audio, control program data, and the like that have been read out are held in the RAM 162. Thereafter the CPU 161 proceeds with processing based on the control programs, various types of data (image data including text images and other images such as polygons of display objects and textures, and audio data), which are being stored in the RAM 162, as well as detection signals and the like from the detection units.

Among various data stored on the ROM 163, data that can be stored on detachable recording media may be readable by, for example, a driver of a hard disk drive, an optical disk drive, a flexible disk drive, a silicon disk drive, and a cassette media reading device, and in this case the recording media includes, for example, hard disks, optical disks, flexible disks, CDs, DVDs, and semiconductor memories.

The network communication unit 18 is for performing transmission and reception of operational information (game operation information) of the player that occurs during execution of the mahjong game and game processing information and the like via the routers 2 then further by way of the network to the client terminal device 1 during competition. Furthermore, the network communication unit 18 is for performing transmission and reception of information relating to individual authentication or the like during reception processing of the players, and game records (game results) at the time of completion of a game between the client terminal devices and the center server device 3 via the routers and the like.

Figure 4:
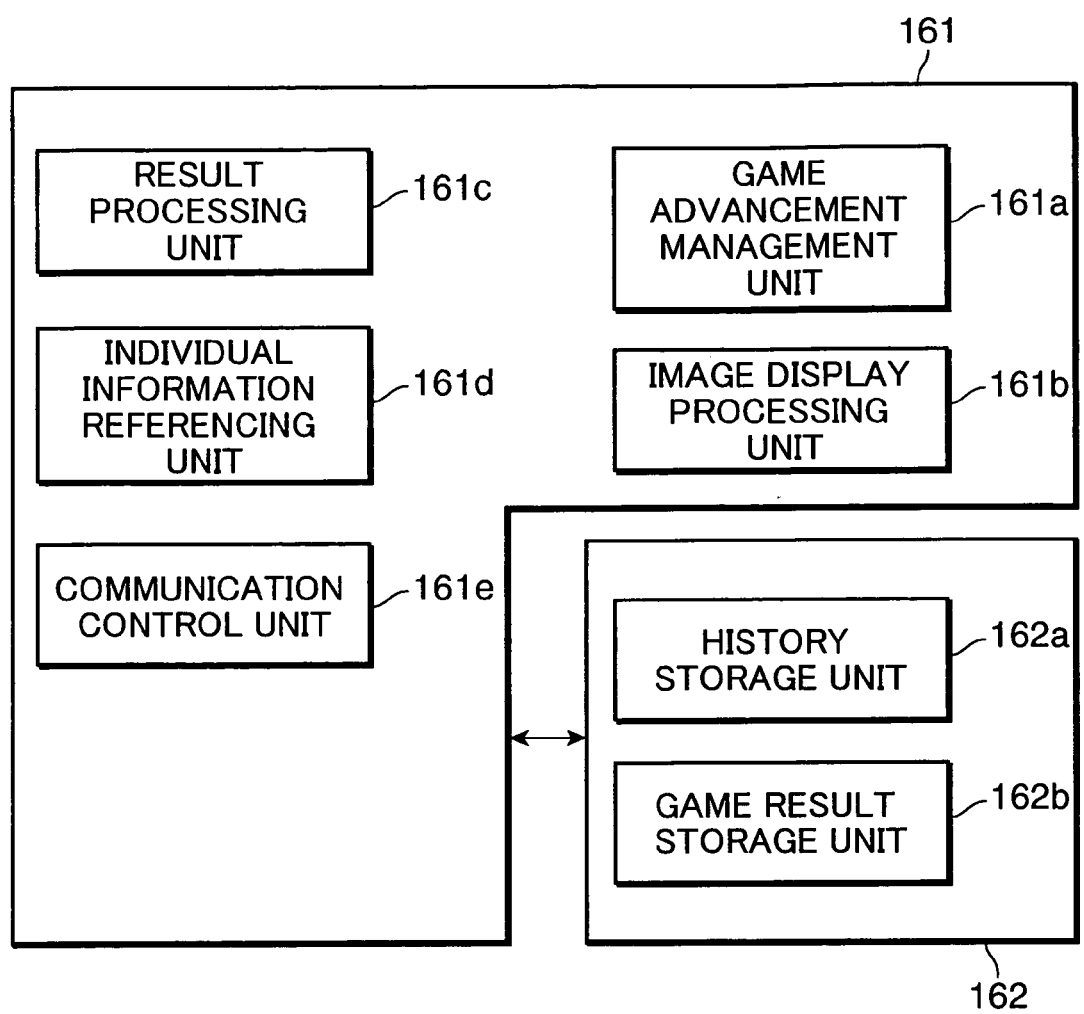
FIG. 4 is a function configuration diagram of a control unit of the client terminal device.

FIG. 4 is a function configuration diagram of a control unit of the client terminal device. The CPU 161 of the control unit 16 is provided with a game advancement management unit 161a that advances the mahjong game by performing reception processing of game participants, advancing a series of processes from game commencement to completion, and receiving operational information from the touch panel 11a, which is the operation unit operated by the player, an image display processing unit 161b that, in addition to demonstration images and various images that constitute the game screens, carries out display on the monitor 3 of images for screens of game reception and completion and the like, as well as various types of images for screens of advertising and participating in game tournaments, which is further described later, a result processing unit 161c that obtains a game result (a score corresponding to a number of chips held) at game completion and a ranking in each game by evaluating player operations during the game, an individual information referencing unit 161d for carrying out individual authentications by referencing information in a received card and individual information stored in the center server device 3, and a communication control unit 161e that carries out communication control of various types of information with other client terminal devices 1 and the center server device 3.

The RAM 162 of the control unit 16 temporarily stores game information from game commencement to completion for the participating client terminal device 1, and is provided with a history storage unit 162a stores in an updating manner the game in-progress information during a game at a same table (same game space) for each player successively, that is, for one's self and all opponent portions obtained via the network communication unit 18, and a game result storage unit 162b that stores for each player the game results (number of chips) from game commencement to completion of the player, which is determined by the result processing unit 161c or game evaluations (scores corresponding to the number of chips) corresponding to the game results.

Figure 5:
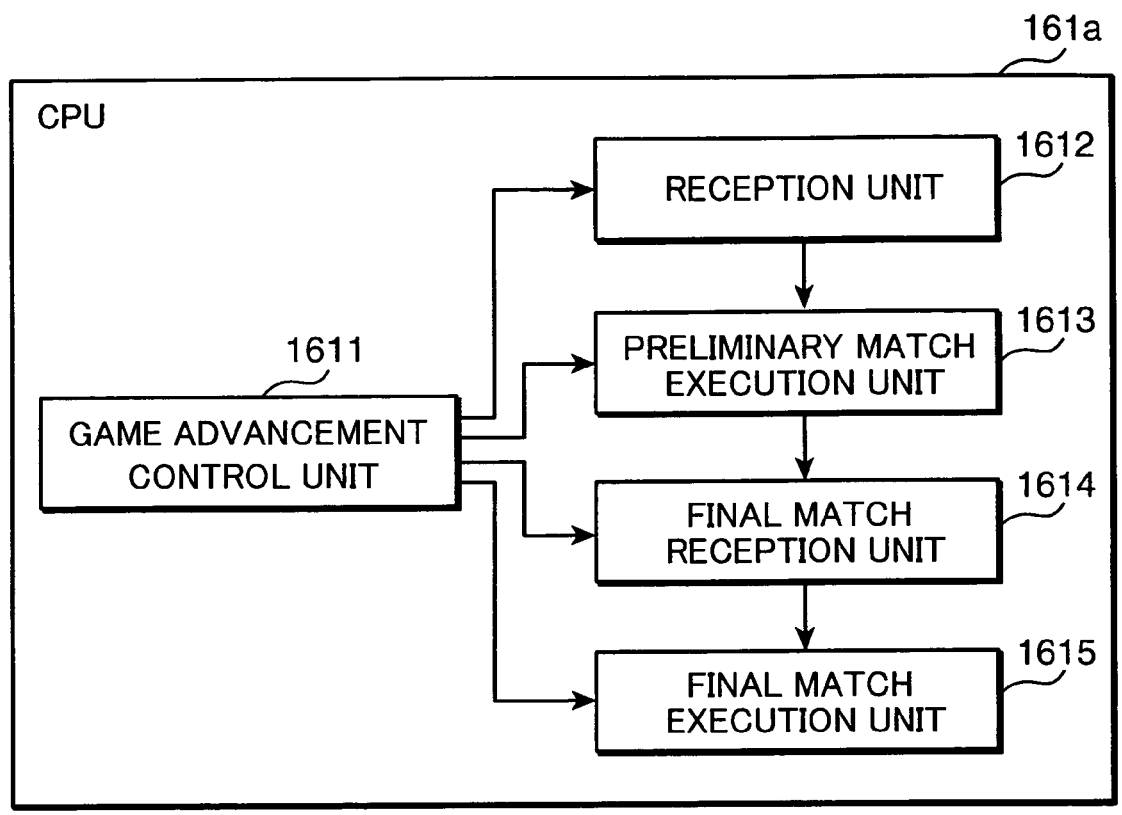
FIG. 5 is a function configuration diagram of a game advancement management unit shown in FIG. 4.

FIG. 5 is a function configuration diagram of the game advancement management unit shown in FIG. 4. The game advancement management unit 161a is provided with a reception unit 1612, a preliminary match execution unit 1613, a final match reception unit 1614, and a final match execution unit 1615, and is further provided with a game advancement control unit 1611 that comprehensively controls execution of these functional units.

The reception unit 1612 receives identification information of the player from an individual card inserted in the card reader 13 to receive players who desire to participate in an ordinary game (other than a game tournament), and during a certain period it receives participation of the player to a preliminary match of a planned game tournament. The preliminary match execution unit 1613 executes a competitive game via the routers (store server devices) 2 among a player whose participation into a tournament has been received and ordinarily three client terminal devices 1, which are specified as opponents from the center server device 3. The final match reception unit 1614 receives identification information of a player to receive participation of that player to a final match of a game tournament during a certain period. The final match execution unit 1615 executes a competitive game via the routers (store server devices) 2 among a player whose advancement to a final match has been received and three client terminal devices 1, which are specified as opponents from the center server device 3.

Figure 6:
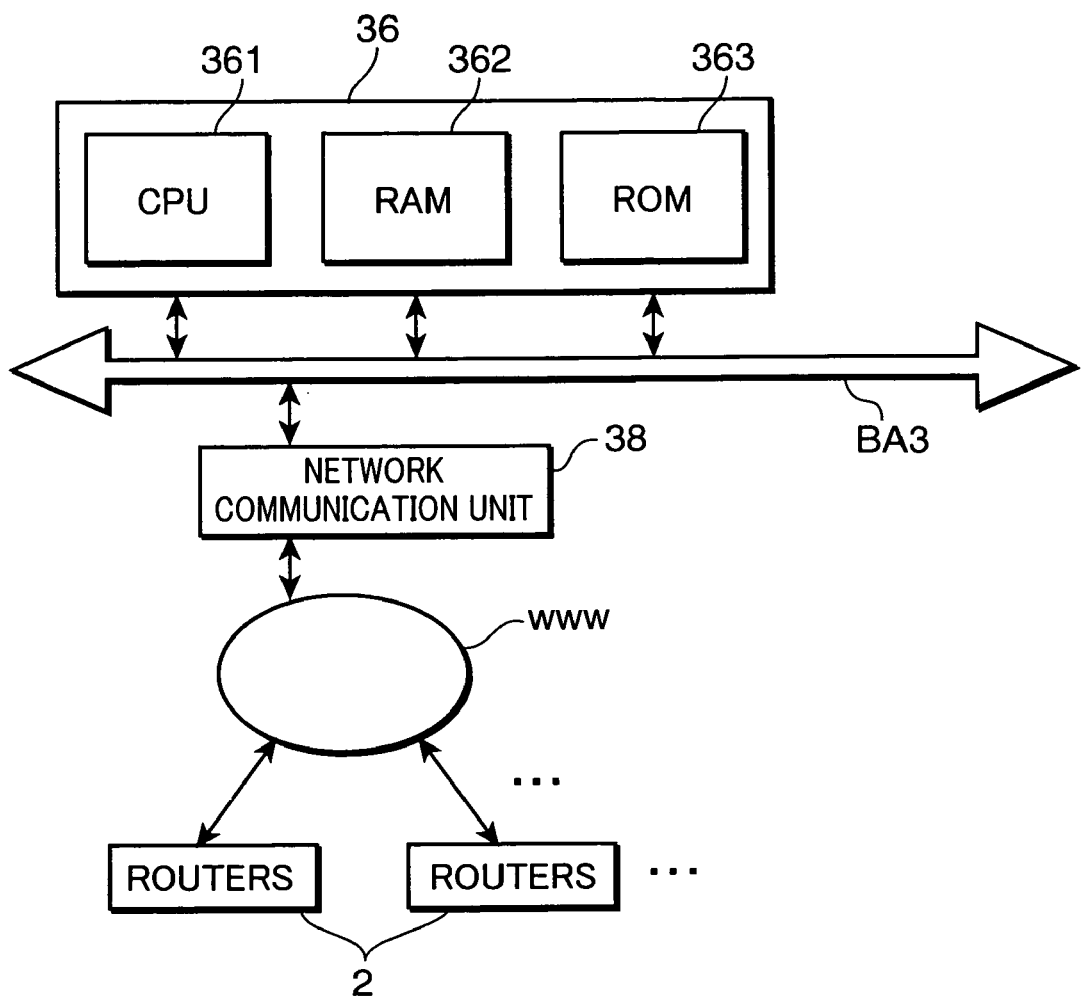
FIG. 6 is a configuration diagram showing a hardware configuration of a center server device provided in the competitive game system.

FIG. 6 is a configuration diagram showing a hardware configuration of the center server device 3 provided in the game system. A control unit 36 controls overall operations of the center server device 3 and is provided with an information processing unit (CPU) 361, a RAM 362 that temporarily stores information and the like during processing, and a ROM 363 on which is stored in advance game tournament management information, programs thereof, a program for processing player selection, a processing program relating to information to be notified to players, which is described later, as well as predetermined image information (images of screens that constitute a provided website if required), individual information of the players, and player information relating to the game for each player, and the like.

Among various data stored on the ROM 363, data that can be stored on detachable recording media may be readable by, for example, a driver of a hard disk drive, an optical disk drive, a flexible disk drive, a silicon disk drive, and a cassette media reading device, and in this case the recording media includes, for example, hard disks, optical disks, flexible disks, CDs, DVDs, and semiconductor memories.

A network communication unit 38 performs information transmission and reception of various data among corresponding client terminal devices 1 in accordance with terminal identification information through any of the plurality of routers 2 via a network constituted by the WWW or the like.

It should be noted that the various aforementioned programs are recorded on the ROM 363 then loaded into the RAM 362, and the respective functions thereof are achieved by successively executing the programs in the RAM 362 by the CPU 361.

Figure 7:
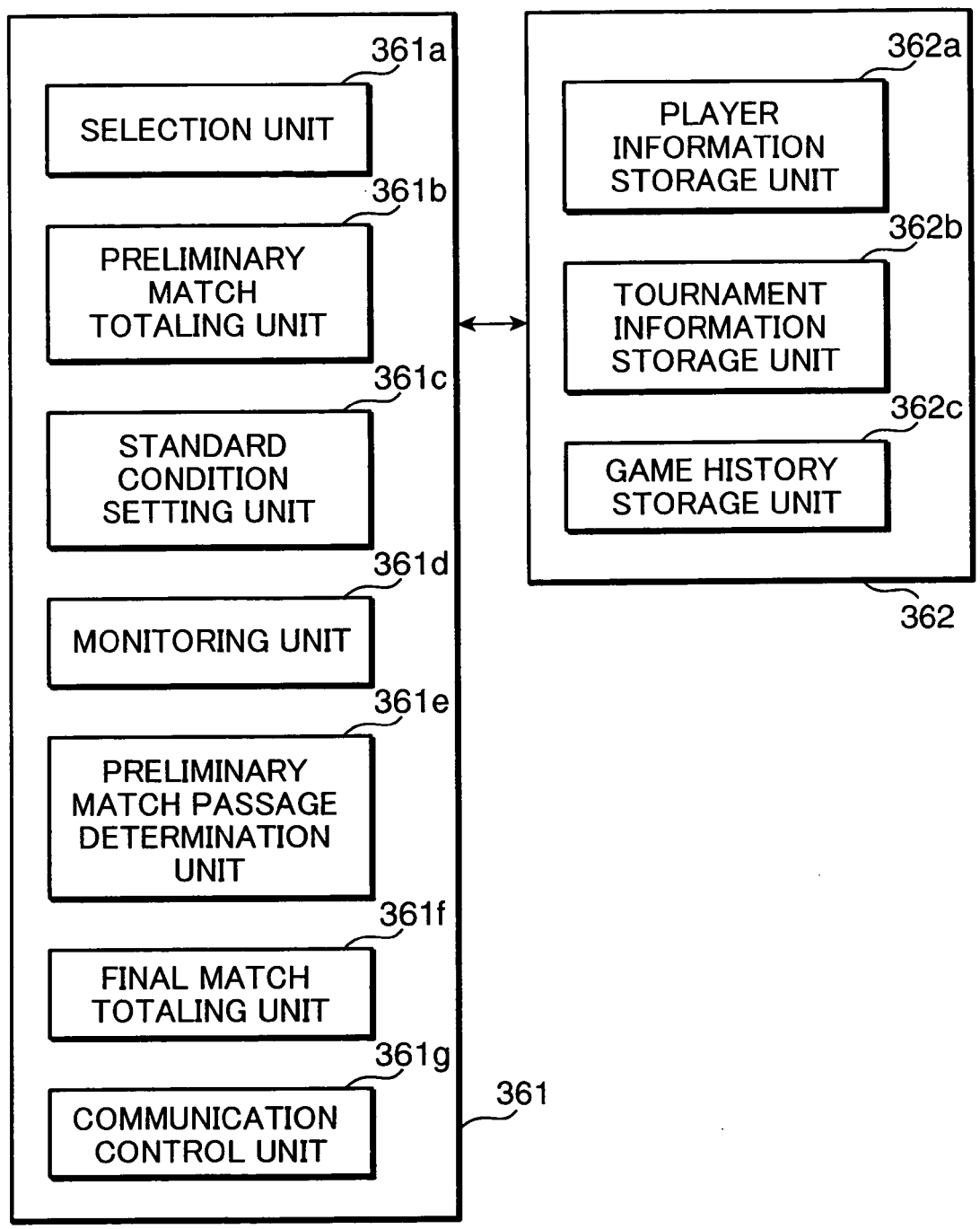
FIG. 7 is a function configuration diagram of a control unit of the center server device.

FIG. 7 is a function configuration diagram of a control unit 36 of the center server device 3. The CPU 361 of the control unit 36 is provided with a selection unit 361a that selects (associated with a same virtual table) from among players received by the reception unit 1612 ordinarily four client terminal devices 1 (four players) to play within the same game space (including both ordinary games and game tournaments) according to predetermined rules, for example, order of arrival, a preliminary match totaling unit 361b that performs a totaling process (processing from accumulation to averaging) continuously, for example for each game, game evaluations based on game results of players who participated in game tournaments carried out within a predetermined preliminary match period of a game tournament, a standard condition setting unit 361c that sets conditions to be cleared in order to clear preliminary match passage to a game tournament, that is standard conditions, which are standard conditions relating mainly to rankings, a monitoring unit 361d that continuously monitors whether the tournament participating player's game ranking meets the standard conditions (has come within from without) or has departed from the standard conditions (has gone without from within), that is, whether or not the standard condition has been crossed over, and separately issues notification to that effect as described later to players when the standard condition is crossed over, a preliminary match passage determination unit 361e that determines whether or not the standard conditions have been reached at a time of the completion of the preliminary match, a final match totaling unit 361f, which determines a ranking in order of highest evaluations at a time of the completion of a final match, for example, in order of highest total value of scores assigned to the players, and a communication control unit 361g, which carries out exchanges of information among the client terminal devices 1 as well as the sending of predetermined information to an email address inputted at a time of player registration or the like from a communication device such as a mobile phone or a personal computer owned by a player who has become a relevant person according to the monitoring of the monitoring unit 361d.

The selection unit 361a carries out selection of opponents in order of arrival for example, and if there is already a virtual table in a standby state in a case where game participation has been received, it associates the received player with the virtual table, and at a time point when four players are associated with the virtual table, it performs processing that members have been decided. Furthermore, at a time when there are no standby players in a case where game participation has been received, the selection unit 361a associates the received player to one virtual table and sets a standby for the reception of the remaining three players. In a case where the standby time has reached a predetermined time, the aforementioned CPU player may be set as one member. Furthermore, the selection of opponents is not limited to the order of arrival, and various other conditional rules may be employed. For example, location or real capabilities may be set as selection conditions, and it is also possible to create a selection rule by mixing these selection conditions.

The RAM 362 of the control unit 36 is provided with a player information storage unit 362a that stores individual information such as ID data and password data and the like of players, a tournament information storage unit 362b that stores all information relating to a game tournament such as tournament name, preliminary match period, and final match period, and a game history information storage unit 362c that stores in an updating manner for each player a total value, which is continuously calculated (totaled) by the preliminary match totaling unit 361b and the final match totaling unit 361f from the aforementioned scores obtained in each game by each player who has participated in a preliminary match and each player who has advanced to a final match. The tournament information storage unit 362b stores a ranking (standard condition) that is a borderline for advancing to a final match in the game tournament. It should be noted that, as is described later, the borderline can be changed during the preliminary match period in response to factors such as the number of participants in the game tournament, and in this case, the borderline is newly stored after the change. Furthermore, the game history information storage unit 362c is also a portion that stores in an updating manner the game history including game results of each player in ordinary games.

Figure 8:
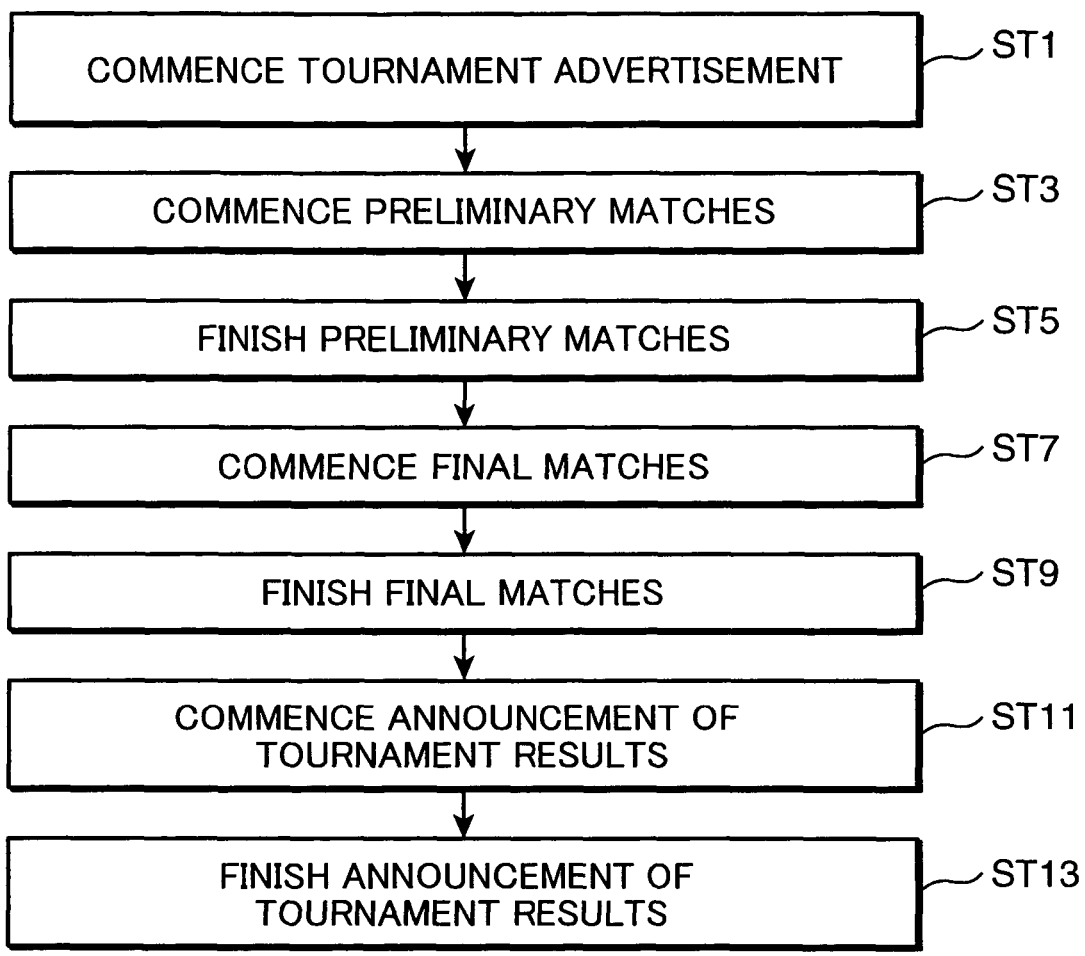
FIG. 8 is a flowchart of game tournament management by the center server device.

FIG. 8 is a flowchart of game tournament management by the center server device. First, notice is given on the monitor 11 that a game tournament is to be held (tournament advertisement) (step ST1). A screen for the tournament advertisement is constituted by images including predetermined content, which includes content of at least the tournament name, a preliminary match reception period, and a final match reception period. The tournament advertisement screen may in a form in which it is displayed repetitively during a demonstration, and may be in a form in which it is displayed in response to reception of participation into an ordinary game. Following this, when the start of the preliminary match reception period has been detected by an unshown internal timer, in addition to participation into an ordinary game, a reception screen is displayed during reception processing having a participation button enabling selection of participation into a game tournament, and a game of a preliminary match can be carried out by pressing the participation button (step ST3). The reception screen is displayed as a reception screen during the preliminary match period.

When completion of the preliminary match period has been detected by the unshown internal timer, the reception screen switches for example an ordinary reception screen to the effect that the preliminary match period has finished and in which the participation button for selecting the game tournament is deleted (step ST5). Following this, when the start of the final match period by has been detected by the internal time, in a similar manner as the foregoing, in addition to participation into an ordinary game, a reception screen is displayed during reception processing having a participation button enabling selection of participation into a final match, and a game of a final match can be carried out by pressing the participation button (step ST7). The reception screen is displayed as a reception screen during the final match period.

When completion of the final match period is detected by the unshown internal timer, completion of the final match is displayed on the reception screen for example (step ST9), or after a set period for totaling has elapsed, an announcement (display of tournament results) commences to the monitor 11 of the tournament results (step ST11). The tournament results can be displayed automatically and repetitively to the monitors 11 of the client terminal devices 1 during demonstration display, or can be displayed by the pressing of a predetermined button on the monitor 11 by a person desiring to view the results so as to be viewed at a desired time. Furthermore, this can also be displayed for an appropriate predetermined time only by the pressing of a button to view the tournament results on the monitor 11 by a player during a game so that the results are viewable. And, when the internal timer detects that a further predetermined period has elapsed, the processing of step ST11 finishes (step ST13).

Figure 16:
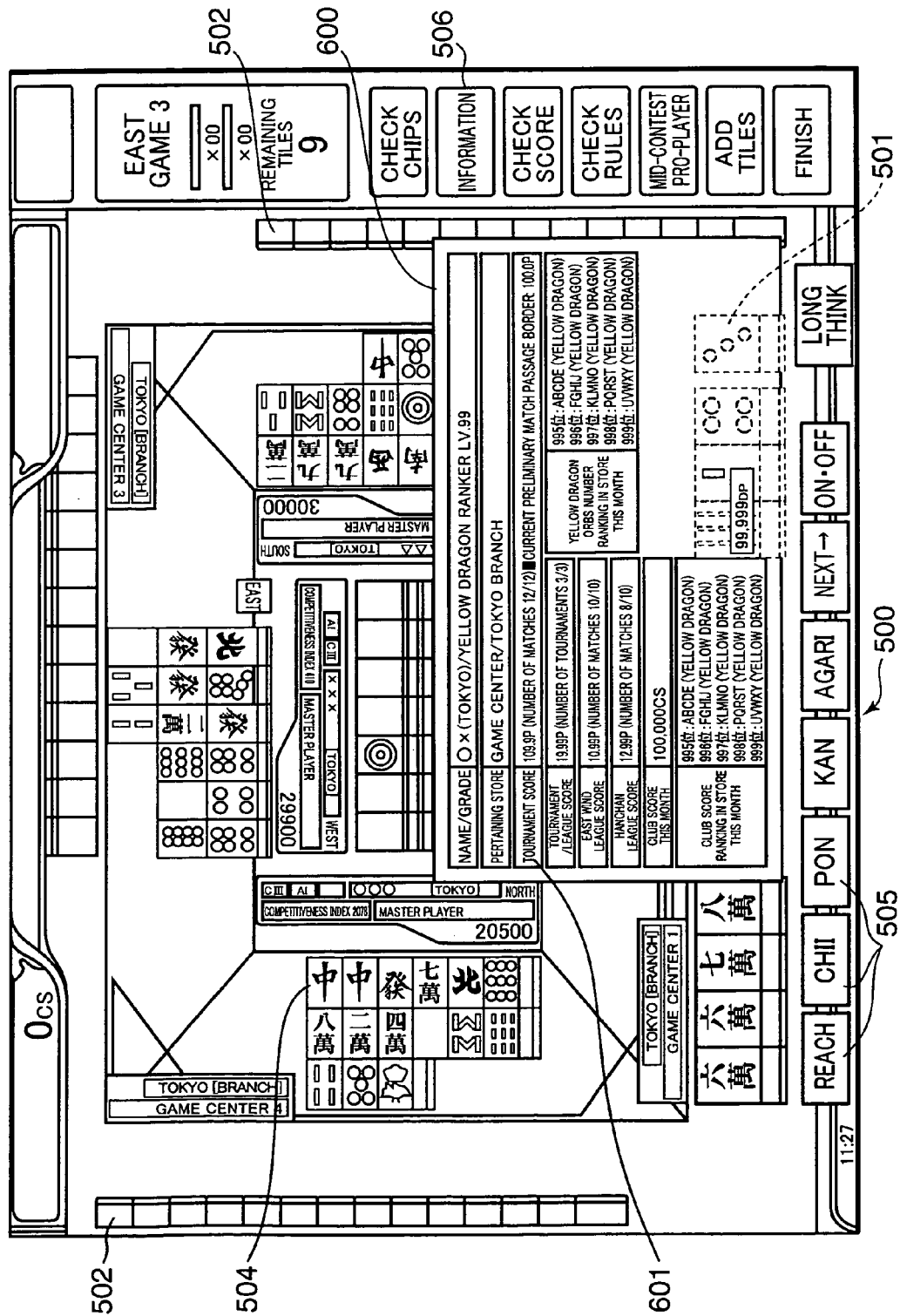
FIG. 16 is one example of a screen diagram of a competition screen indicating a competition status in a preliminary match of a game tournament.

FIG. 16 is one example of a screen diagram of a competition screen indicating a competition status in a preliminary match of a game tournament. A competition screen region 500 is set in a main region of the game screen, and a tournament information display screen region 600 is set in a predetermined portion region superimposed on this main region (it should be noted that an image of the tournament information display screen region 600 is displayed in a semitransparent manner in the superimposed region such that the competition screen region 500 is lightly visible). In the competition screen region 500, held-tiles 501 of the player are displayed at the lower side of the screen so that the types of tiles are visible, held-tiles 502 of the opponents are displayed at the upper side and left and right sides of the screen so that the types of tiles are visible, a draw pile 503 including displayed lucky tiles and discarded tiles 504 around the draw pile 503 are displayed substantially in the middle of the screen, and various buttons 505 to be pressed by the player are displayed on the lower side of the screen. The game advances by the player pressing the buttons 505 as required while observing the competition screen 500. An information button 506 on the right side of the screen is a view button that instructs the display (viewing) of tournament information.

FIG. 16 is an example screen of a case where the view button has been pressed, and a tournament score (corresponding to totaled game evaluations), which is a current score of the player in a portion of the tournament information display screen region 600, is displayed as 109.9 P (points), and a score of a current preliminary match passage border (corresponding to the standard condition) is displayed as 100.0 P (points). From both scores it is evident that the player is within the current preliminary match passage (standard condition).

Figure 9:
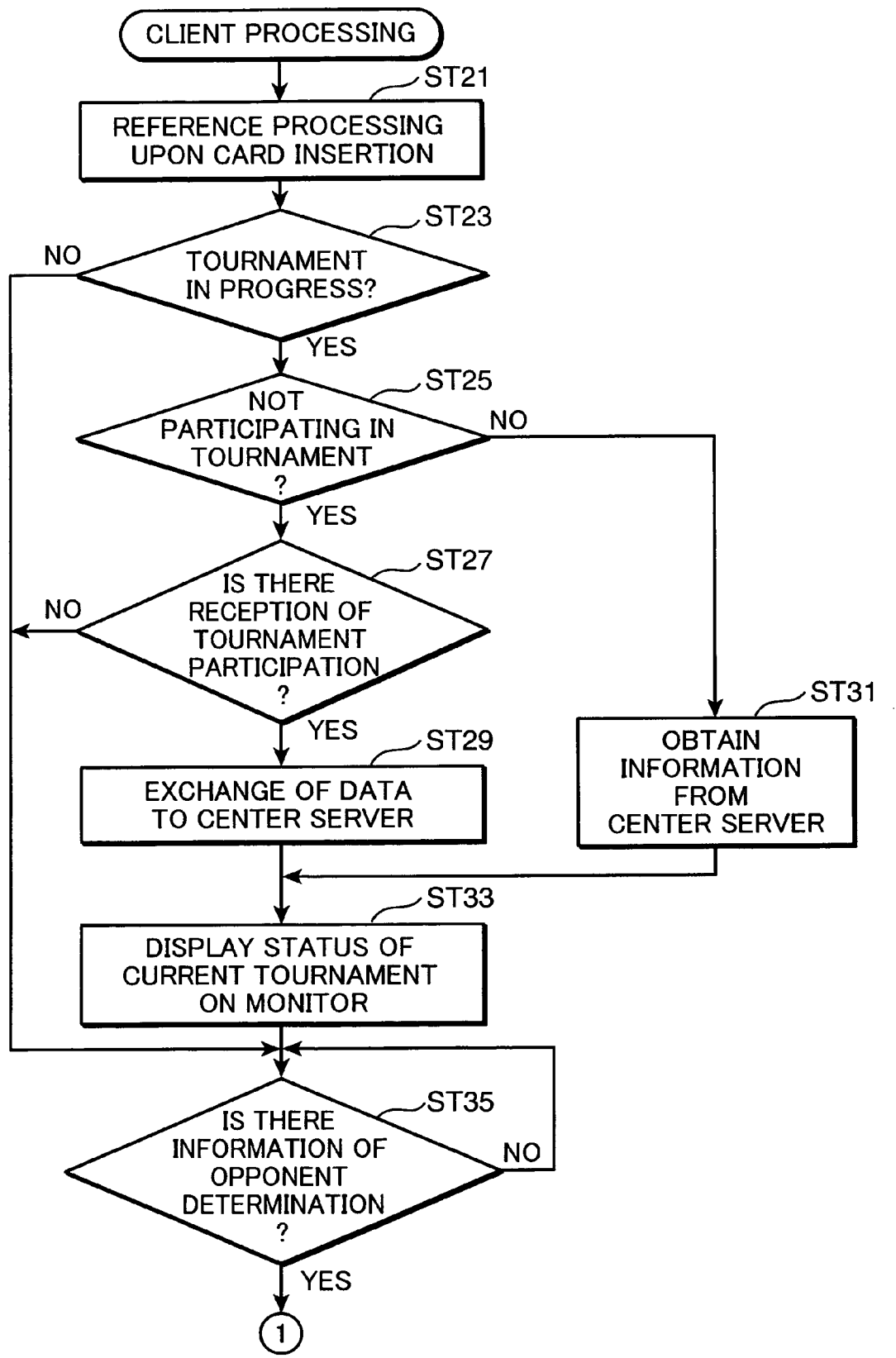
FIG. 9 is a flowchart of a series from reception processing until game completion processing including participation into a game tournament at the client terminal device.
Figure 10:
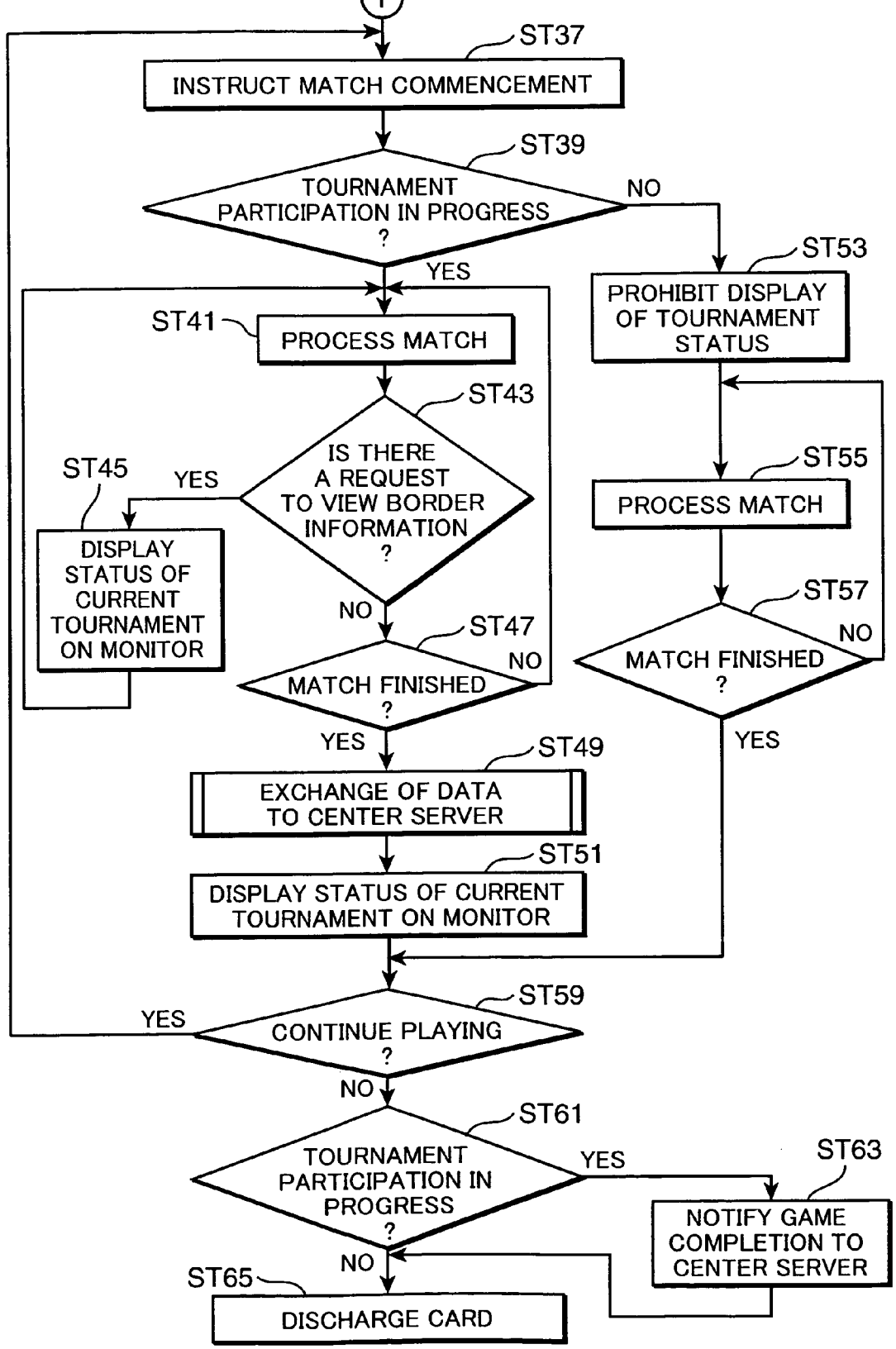
FIG. 10 is a flowchart of a series from reception processing until game completion processing including participation into a game tournament at the client terminal device.
Figure 15:
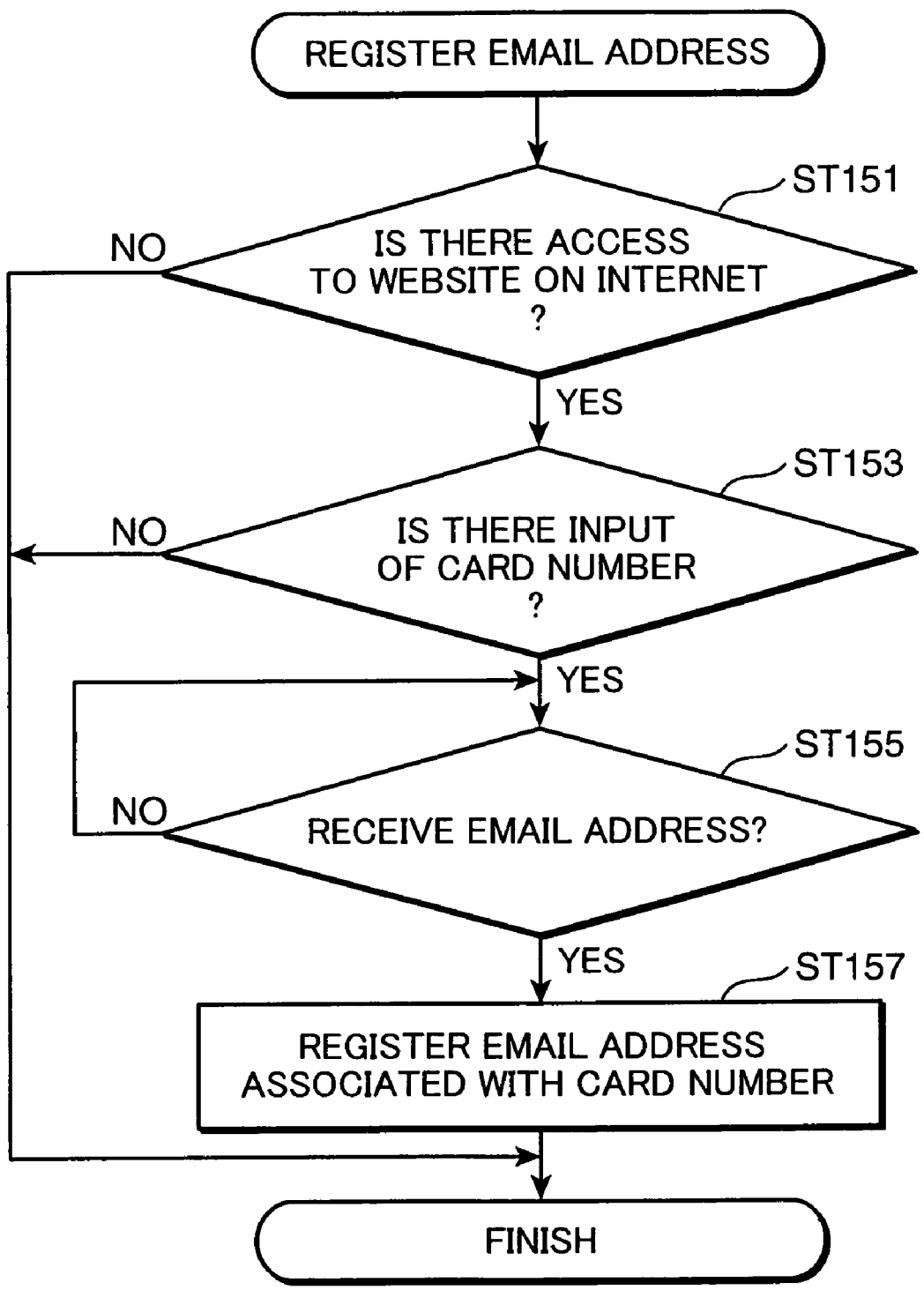
FIG. 15 is a flowchart showing a registration process of email addresses.

FIG. 9 and FIG. 10 are flowcharts of a series from reception processing until game completion processing including participation into a game tournament at a client terminal device. First, the present flow is commenced by a reservation unit 1612 of the game advancement management unit 161a when an individual card is inserted into the card reader 13 (insertion of the card is detected by an unshown but commonly known sensor). First, user ID data is read in from the individual card and a password required for individual authentication is received by the touch panel 11a. Then, the received user ID data and password are sent to the center server device 3 by the reception unit 1612 of the game advancement management unit 161a, and an individual reference is carried out between this and data of the player information storage unit 362a of the center server device 3, a result of which is received, then the individual referencing finishes (step ST21). It should be noted that when an individual card is obtained and registration is initially being carried out, it is possible to employ a mode in which an email address of a communication device such as a mobile phone or a personal computer or the like is inputted to a registration screen of the monitor 11 created by the reception unit 1612. Alternatively, a form in which an email address is inputted separately may be used as shown in FIG. 15, which is described in detail later, or both modes may be employed.

In a case where the individual referencing is denied, an error message on the monitor is displayed on the monitor 11 and processing finishes. On the other hand, in a case where the individual referencing is affirmed, the reception unit 1612 determines whether or not the current date and time is within the preliminary match period (step ST23). In a case where it is determined to be within the preliminary match period (YES at step ST23), a determination is performed from the user ID data as to whether or not the player is participating in the preliminary matches (step ST25). In a case where it is determined that the player is not yet participating in the preliminary matches (YES at step ST25), a determination is performed as to whether or not reception of tournament participation has been performed (step ST27). That is, the determination is performed based on a detection signal from the touch panel 11a by whether or not a button for selecting tournament participation on the monitor 11 has been pressed. In a case where it is determined that the relevant participation button has been pressed, the flow proceeds to step ST29, and if this is not the case, the flow proceeds to step ST35. On the other hand, in a case where it is determined that the player has already participated in a preliminary match of the game tournament (NO at step ST25), the flow proceeds to step ST31.

As a result of the processing at steps ST29 and ST31, the center server device 3 executes predetermined information processing and the transmission of processed information, which is described later, and at step ST33, a current status of the game tournament is displayed on the monitor 11. Following this, a determination is performed as to whether or not opponent selection processing has finished at the center server device 3 (step ST35), and if selection of opponents has finished, then a game (match) commencement instruction is carried out (step ST37) by information to that effect and player information of the opponent being obtained from the center server device 3.

Following this, a determination is performed as to whether or not the relevant client terminal device 1 will play in the game tournament, and if this client terminal device 1 is not playing in the game tournament, then nonparticipation in the tournament is assumed and match processing commences for an ordinary game (step ST53), and a state is set (prohibiting flag setting) prohibiting the display of information relating to the game tournament (step ST55). Then, a determination is performed as to whether or not the match in the ordinary game has finished (step ST57), and if it has finished, then a determination is performed as to whether or not playing is to be continued (step ST59), and when it is detected via the touch panel 11a that a predetermined continue button has been pressed, the flow transitions to step ST37 and the next match commences. When it is determined that the continue button has not been pushed, the flow proceeds to step ST61.

On the other hand, in a case where the player of the relevant client terminal 1 is a participant into the game tournament in step ST39, match processing commences for a tournament preliminary match (step ST41), and following this, a determination is performed as to the presence/absence of a view request for tournament borderline information (step ST43), and when it is detected via the touch panel 11a that a view button 506 (see FIG. 16) has been pressed, current status information of the tournament is obtained from the center server device 3 and displayed on the monitor 11 (step ST45), and the flow returns to step ST41. Following this, a determination is performed as to whether or not the match in the game tournament has finished (step ST47), and if it is not finished, then the flow returns to step ST41, but if it has finished, then the flow proceeds to step ST49 and game result information of the time of match completion is sent to the center server device 3 for the predetermined totaling process, and a totaled result is displayed on the monitor 11 as a current status of the tournament (step ST51).

In a case where the match is to continue at step ST59, the flow returns to step ST37, and if the match is finished a determination is performed as to whether or not the player is currently participating in the tournament (step ST61). If the player is currently participating in the tournament, then a signal indicating play completion (game completion) is sent to the center server device 3 (step ST63), and the individual card is discharged (step ST65). It should be noted that in a case where the player is not currently participating in the tournament at step ST61, that is, in a case of an ordinary game, the individual card is discharged as it is (step ST65). Also note that, at the time of completion of the ordinary game, the game result may by stored for each player in the history of game results of ordinary games of the center server device 3. In this way, records are kept of ordinary games.

Figure 11:
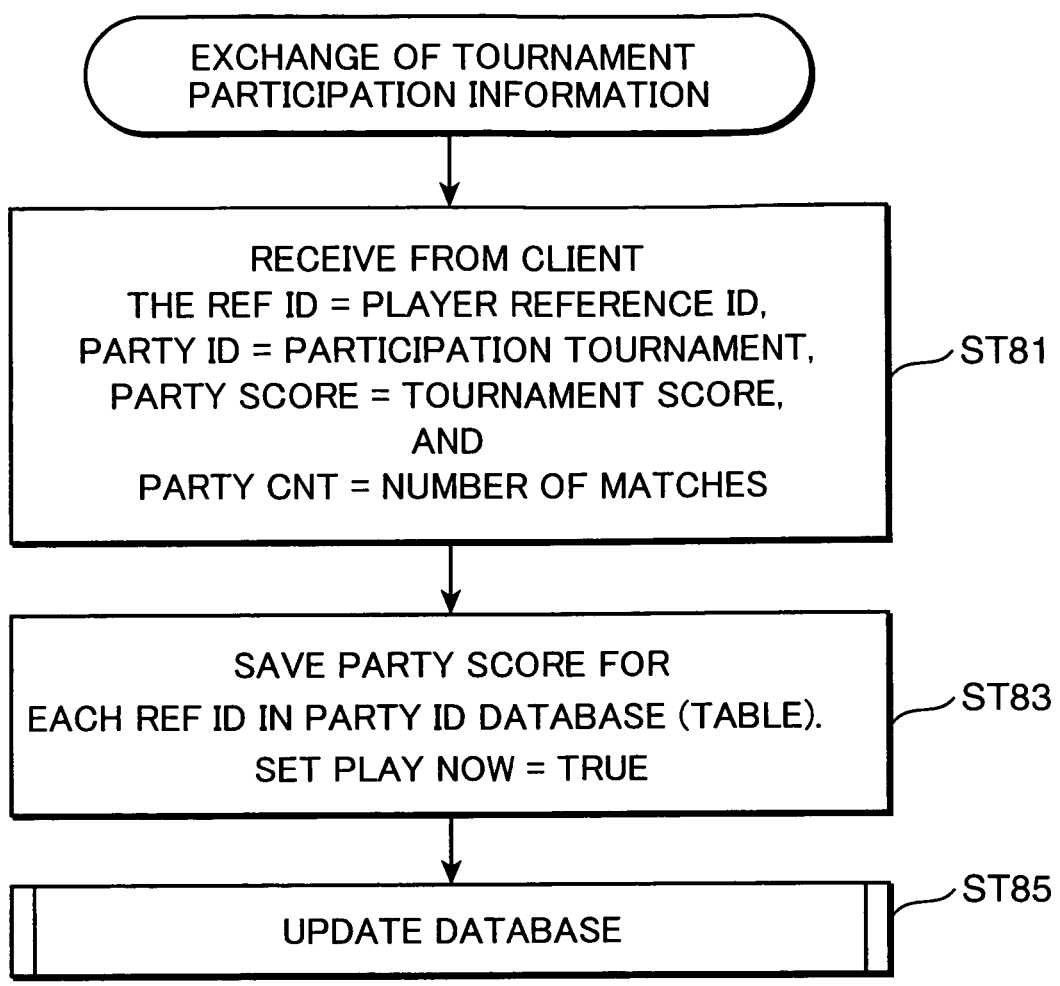
FIG. 11 is a flowchart of a processing by the center server device corresponding to a data transmission process in the above-mentioned flowchart.

FIG. 11 is a flowchart of a processing by the center server device 3 corresponding to the data transmission processing of step ST29. First, the following information from the client terminal device 1 is sent to the center server device 3 (step ST81). That is, the information sent from the client terminal device 1 to the center server device 3 is a RefID, which is a player reference ID for specifying a player, a PartyID for specifying a tournament that has been participated in, a PartyScore, which is a tournament score, and a PartyCnt, which indicates a number of matches.

In the center server device 3, the tournament score PartyScore is saved for each player RefID in a database of participation tournament PartyID of the tournament information storage unit 362b and a match in-progress PartyNow is set to TRUE (step ST83). Following this, a database updating process, that is, the totaling process and the required notification processing are executed (step ST85).

Figure 12:
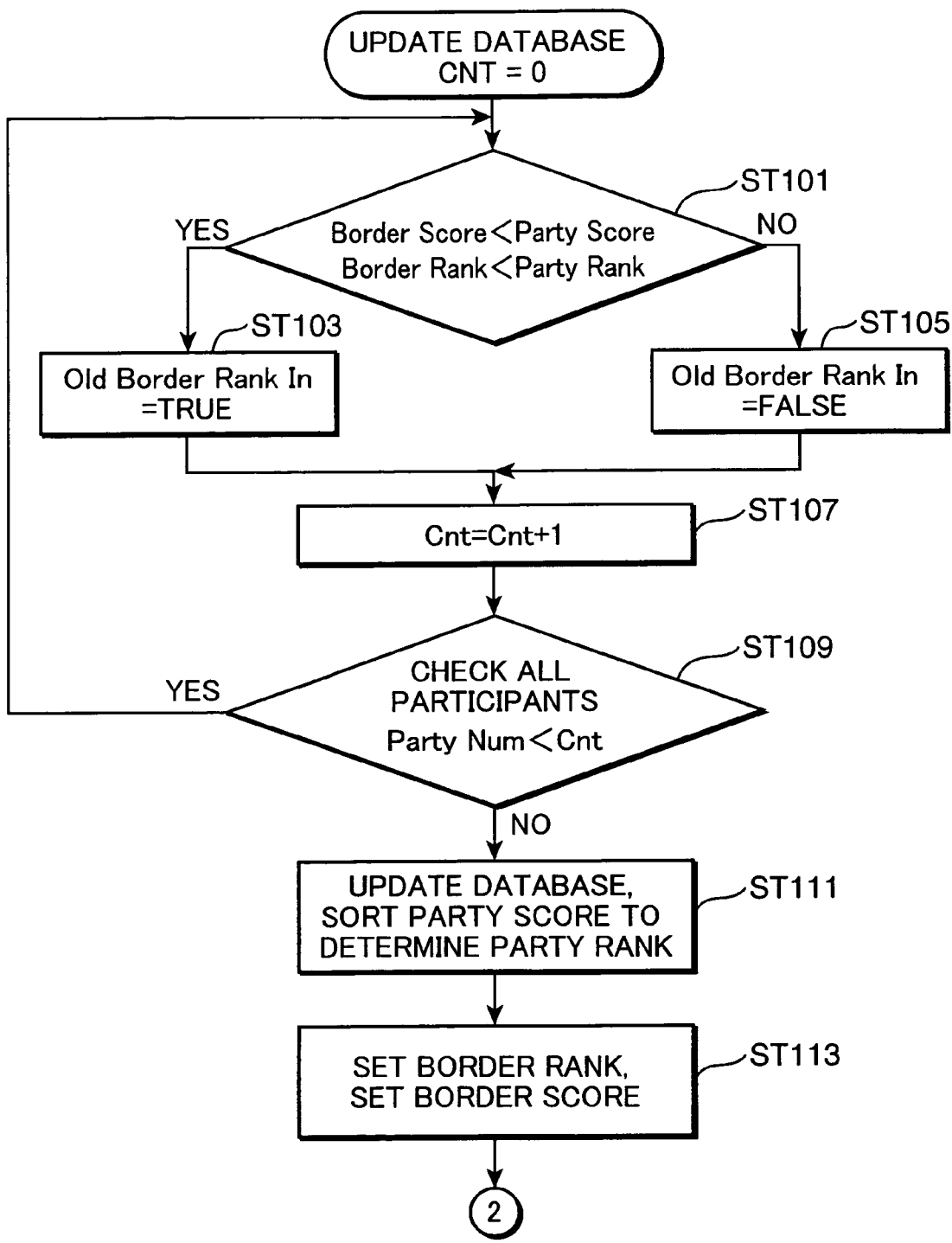
FIG. 12 is a flowchart of a database updating process in the above-mentioned flowchart.
Figure 13:
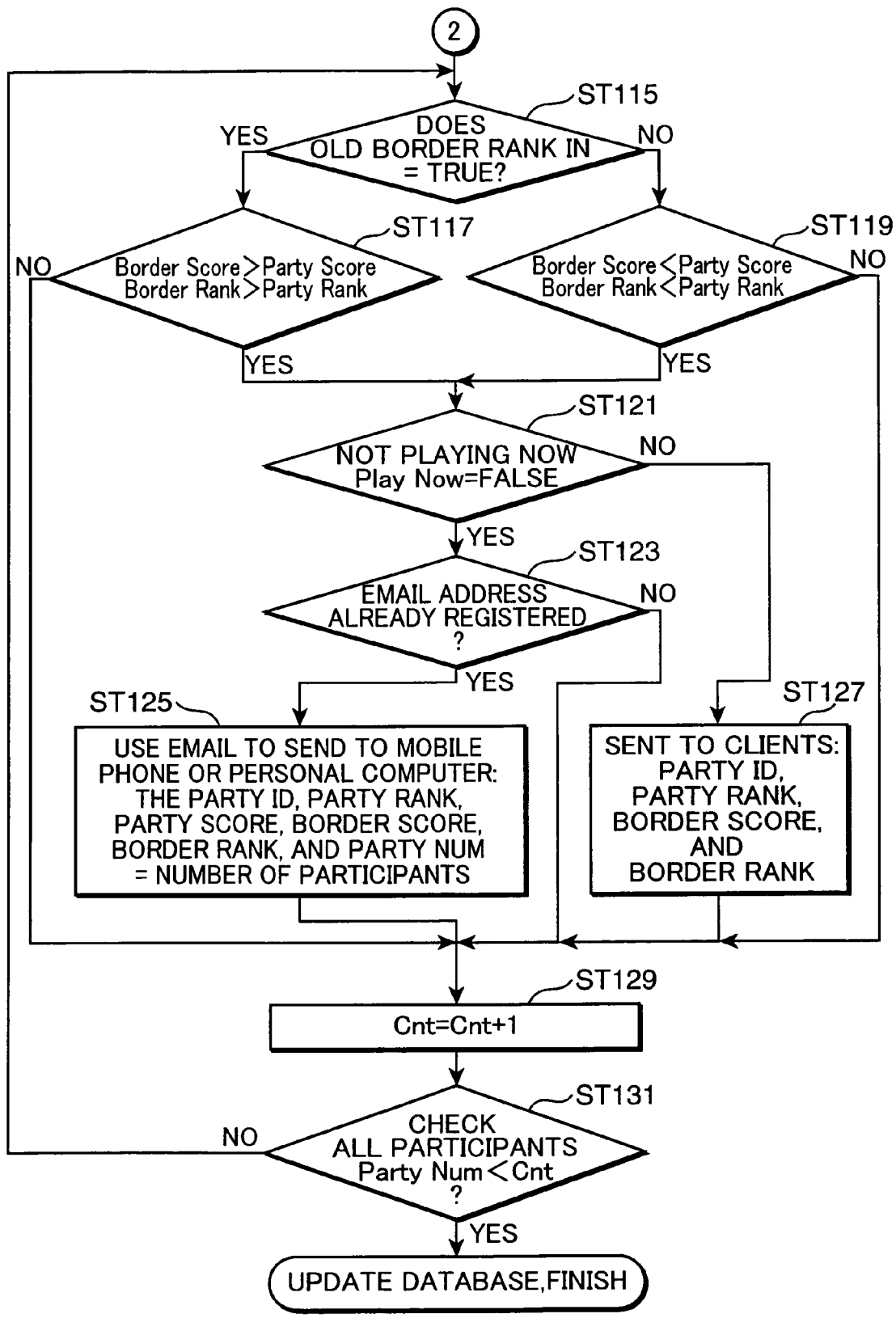
FIG. 13 is a flowchart of a database updating process in the above-mentioned flowchart.

FIG. 12 and FIG. 13 are flowcharts of the database updating process of step ST85. First, a counter Cnt that indicates a number of players participating in a tournament is reset to a value of zero as preprocessing for updating, then determinations are performed as to whether or not the border score BorderScore<tournament score PartyScore, and BorderRank<PartyRank (step ST101). It should be noted that the border score BorderScore is a score of a border enabling passing of a preliminary match, the tournament score PartyScore is a current totaled score of a player, a border ranking BorderRank is a ranking of the border for enabling passing of a preliminary match, and a tournament ranking PartyRank is a current ranking of a player.

When step ST101 is affirmative, an old border ranking OldBorderRankIn is set to TRUE (step ST103). On the other hand, when step ST101 is negative, the old border ranking OldBorderRankIn is set to FALSE (step ST105). Here, the old border ranking OldBorderRankIn being TRUE indicates that within the border ranking was determined in the previous determination of this flowchart and the old border ranking OldBorderRankIn being FALSE indicates that outside the border ranking was determined in the previous determination of this flowchart. Furthermore, the symbol "In" at the end of OldBorderRankIn is a count value for processing rankings with respect to all the players.

Following this, the counter Cnt is incremented by one (step ST107), and a determination is performed as to whether or not a check has been carried out with respect to PartyNum<Cnt, that is, all tournament participants (step ST109). If it is determined that checking for all tournament participants is finished (NO at step ST109), then an update of the database is carried out (step ST111). That is, a sorting (rearrangement) process is executed in order of highest tournament score PartyScore, and a ranking is determined corresponding to the current score of the relevant player in the tournament rank PartyRank. It should be noted that in the sorting process, in a case where it is determined that the number of matches PartyCnt does not exceed a predetermined value (predetermined number of matches), the relevant player is excluded from the sorting targets and arranged at a lower rank of excluded players. The predetermined value may be a fixed value, but may also be varied so as to be increased in response to the passing of time during the preliminary match period.

Following this, in accordance with the sorting results, the border ranking BorderRank is set, and the border score BorderScore is set, further still the number of players Cnt is set to zero (step ST113). It should be noted that it is preferable for the border ranking BorderRank and the border score BorderScore to be set to corresponding values. For example, in a case where the border ranking BorderRank is set to a top 30 positions, the border score BorderScore is a score corresponding to the 30 positions. Next, a determination is performed as to whether or not the old border ranking OldBorderRankIn is TRUE in order for all players (step ST115). If the old border ranking OldBorderRankIn is TRUE, then a determination is performed as to whether or not the border score BorderScore>the tournament score PartyScore and the BorderRank>PartyRank (step ST117), that is, a determination is performed as to whether or not the player is outside the border. Conversely, if the old border ranking OldBorderRankIn is not TRUE (if it is FALSE), then a determination is performed as to whether or not the border score BorderScore<the tournament score PartyScore and the BorderRank<PartyRank (step ST119), that is, a determination is performed as to whether or not the player is within the border. In other words, at steps ST1117 and ST119, determinations are performed as to whether or not a player who was inside the border at the previous check is outside the border in the present check, that is, whether or not the player has crossed over the border, or whether or not a player who was outside the border at the previous check has become inside the border in the present check, that is, whether or not the player crossed over the border.

Following this, a determination is performed as to whether or not a game in-play PlayNow is FALSE, that is, whether or not game play is in progress (step ST121). If game play is not in progress, a determination is performed as to whether or not an email address MailAddress has been registered already by the relevant player (step S123), and if registered already, then a connection with the mobile phone 4 having the email address is carried out, an email to be sent is created, and sending of the created email is carried out (step ST125). The content of the email to be sent is the participation tournament PartyID, the tournament ranking PartyRank, the tournament score PartyScore, the border score BorderScore, the border ranking BorderRank, and the number of participants PartyNum. It should be noted that a display screen of the mobile phone 4 is described later.

On the other hand, if game play is in progress at step ST121, the sending of predetermined information is carried out to the client terminal device 1 that is in play (step ST127). The content of the predetermined information is the participation tournament PartyID, the tournament ranking PartyRank, the border score BorderScore, and the border ranking BorderRank. It should be noted that the tournament score PartyScore held by the client terminal device 1 can be used.

These sets of information and the already held tournament score PartyScore are displayed on the monitor 11 of the client terminal device 1.

Figure 17:
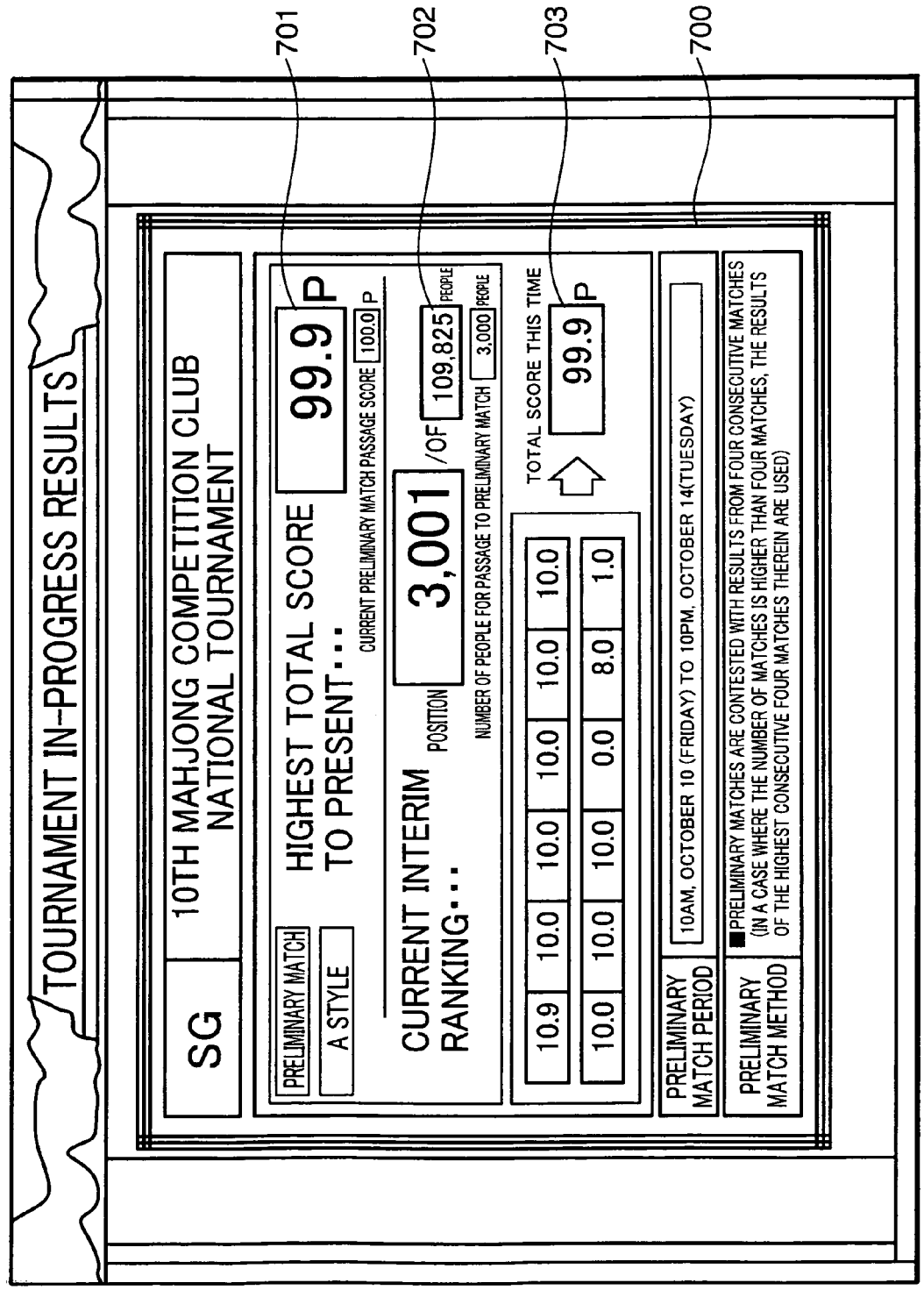
FIG. 17 is an example screen showing tournament in-progress results to be sent to a client terminal device of a player in the above-mentioned flowchart.

FIG. 17 is an example of a screen displayed of tournament in-progress results due to processing at step ST127. As shown in the diagram, a tournament in-progress result screen 700 is displayed on substantially the entire monitor 11. In a current totaled score field 701 in the screen 700, a score of 99.9 P is displayed. As displayed in a lower level area of this screen in this example, a totaled scored, which is game evaluations, among four consecutive matches is employed as a largest series of matches (series of games). Furthermore, 100.0 P is displayed as a current preliminary match passage score below the totaled score field 701. In a current ranking field 702 it is displayed that the player is in position 3,001 of 109,825 players and that there are 3,000 persons as the number of persons for preliminary match passage (standard condition). A totaled score details field 703 displays contents of a predetermined number of consecutive matches, for example a series of matches (series of games) in which the totaled score is largest of game evaluations among four matches, and a totaled score of 99.9 P is displayed. This screen is a screen in which the player has changed from a state of having a ranking within the number of persons for preliminary match passage, to now being outside the number of persons for preliminary match passage, that is, crossing over the standard condition.

In this regard, at steps ST117 and ST119, in a case of the player being within the border at the previous check and within the border also at the current check, or in a case of the player being outside the border at the previous check and outside the border also at the current check, that is, in cases where the border is not crossed over, the flow proceeds to step ST129 bypassing steps ST121 to ST127. At step ST129, the number of players Cnt is incremented by one, that is, a transition is made to the next player, and a determination is performed as to whether or not a total number of participants PartyNum<Cnt, that is, whether or not a check has been carried out on all the participants (step ST131), and if this determination is negative, the flow returns to step ST115, and sequential checks are carried out on the remaining participant players. On the other hand, if checks have been carried out on all the participants, the present flow finishes.

Figure 18:
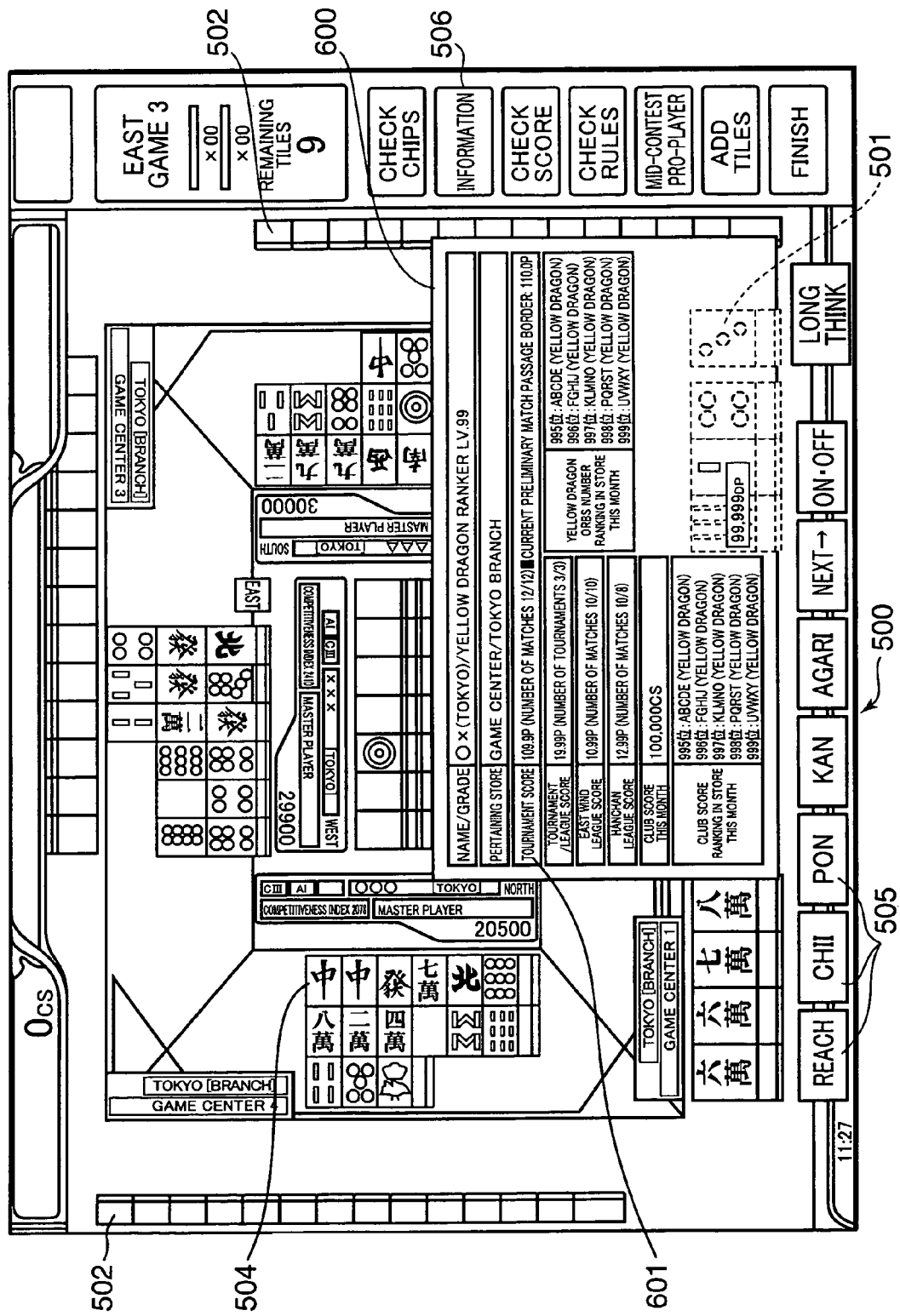
FIG. 18 is an example screen during a final match corresponding to FIG. 16.
Figure 19:
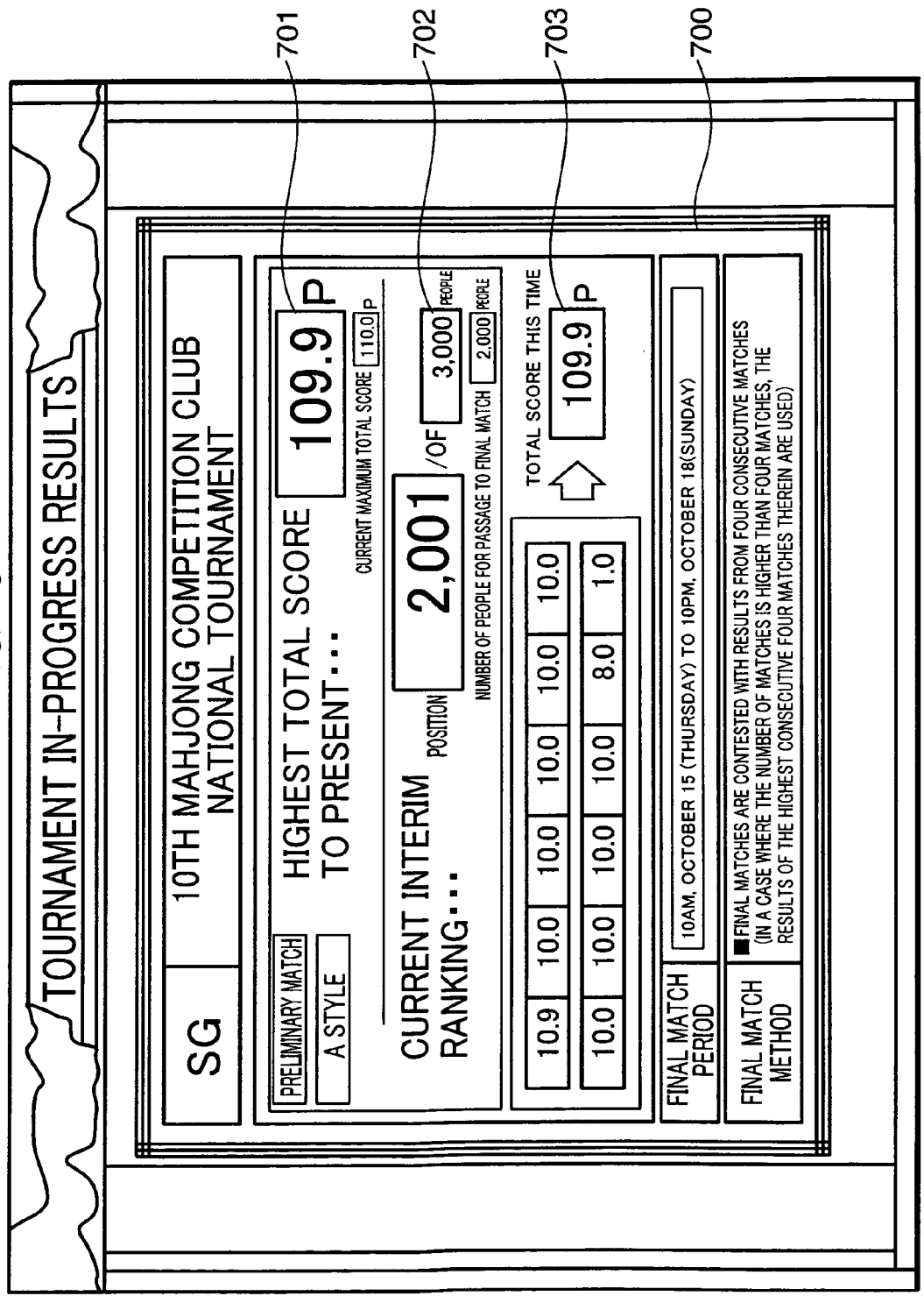
FIG. 19 is an example screen during a final match corresponding to FIG. 17.

It should be noted that FIG. 18 and FIG. 19 are example screens of a time of final matches. In regard to the final matches, the flowcharts shown in FIG. 12 and FIG. 13 are used in a similar manner in the final matches also, and a standard condition in the final matches is a condition for achieving a winning place in the tournament. It should be noted that in FIG. 18, a score of 109.9 P has been acquired as a tournament score, and a winning place border is 110.0 P. FIG. 19 is an example screen of a case where the view button has been pressed, and a tournament score (corresponding to totaled game evaluations), which is a current score of the player in a portion of the tournament information display screen region 600, is displayed as 109.9 P (points), and a score of a current winning place border (corresponding to the standard condition) is displayed as 110.0 P (points). Furthermore, the current ranking indicates a position 2,001 among 3,000 persons competing in the final matches, and it is evident that this is insufficient for the 2,000 number of persons in winning places, which is the standard condition.

Figure 14:
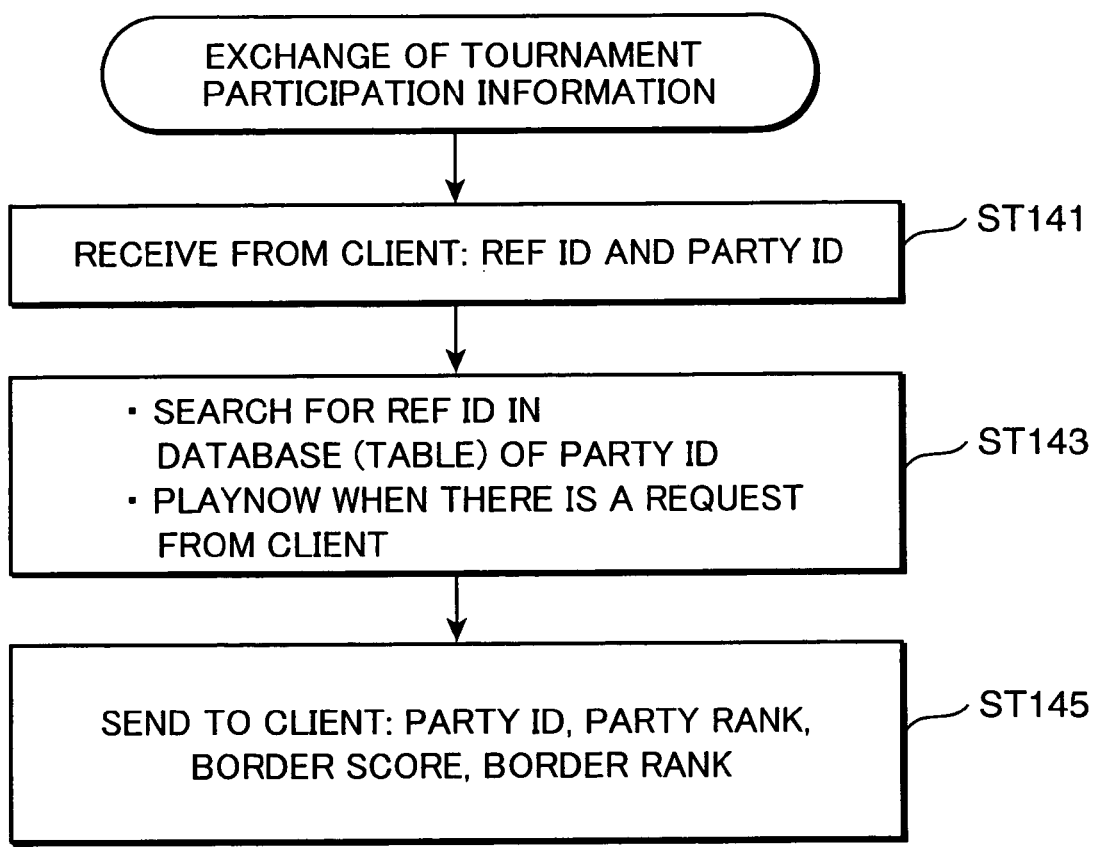
FIG. 14 is a flowchart of the center server device and shows transmission processing of tournament participation information with client terminal devices of players who have completed tournament participation.

FIG. 14 is a flowchart of the center server device and shows transmission processing (step ST31) of tournament participation information with client terminal devices of players who have completed tournament participation. First, when the player RefID, which has already undergone referencing and been read from the individual card, and the participation tournament PartyID, which is specified by the player, are received from the client terminal device 1 (step ST141), a search is executed for the player RefID in the database of the participation tournament PartyID, and result information of the relevant player in the relevant game tournament is extracted (step ST143). It should be noted that in a case where there is a request from the client terminal device 1 indicating play in-progress, a PlayNow (flag) is set. Following this, of the extracted information, the player RefID, the participation tournament PartyID, the border score BorderScore, and the border ranking BorderRank are sent to the relevant client terminal device 1 (step ST145).

A commonly known item is employed as the mobile phone 4. The mobile phone 4 is provided with a control unit constituted by a computer that collectively controls each unit of the mobile phone, and the control unit is provided with a group of keys including numerical keys as an operational member, a monitor for displaying images, a VRAM that stores image data to be displayed on the monitor, a transceiver antenna for carrying out communications such as ordinary phone calls and email, a RAM that temporarily stores data, and a ROM that stores control programs and the like.

FIG. 15 is a flowchart showing a registration process of email addresses. First, it is assumed that there is access to a predetermined website on a network (Internet) using a browser function of one's own mobile phone 4. This predetermined website is configured on the center server device 3 itself or communicably configured with the center server device 3, and is constructed such that images of screens of the predetermined website are sent to the mobile phone 4 and displayed on the screen of a display unit of the mobile phone 4. This screen displays a card number input guide and an email address input guide.

After there is access to the website (step ST151) and the screen has been sent, the center server device 3 determines a presence/absence of input of a card number of an individual card used for the game of the client terminal device 1 (step ST153), and when it determines that there is input of a card number, then following this it performs a determination of a presence/absence of input of an email address (step ST155). Then, when it is determined that an email address has been received, the email address is associated with the card number and registered in the player information storage unit 362a of the center server device 3 (step ST157).

Figure 20:
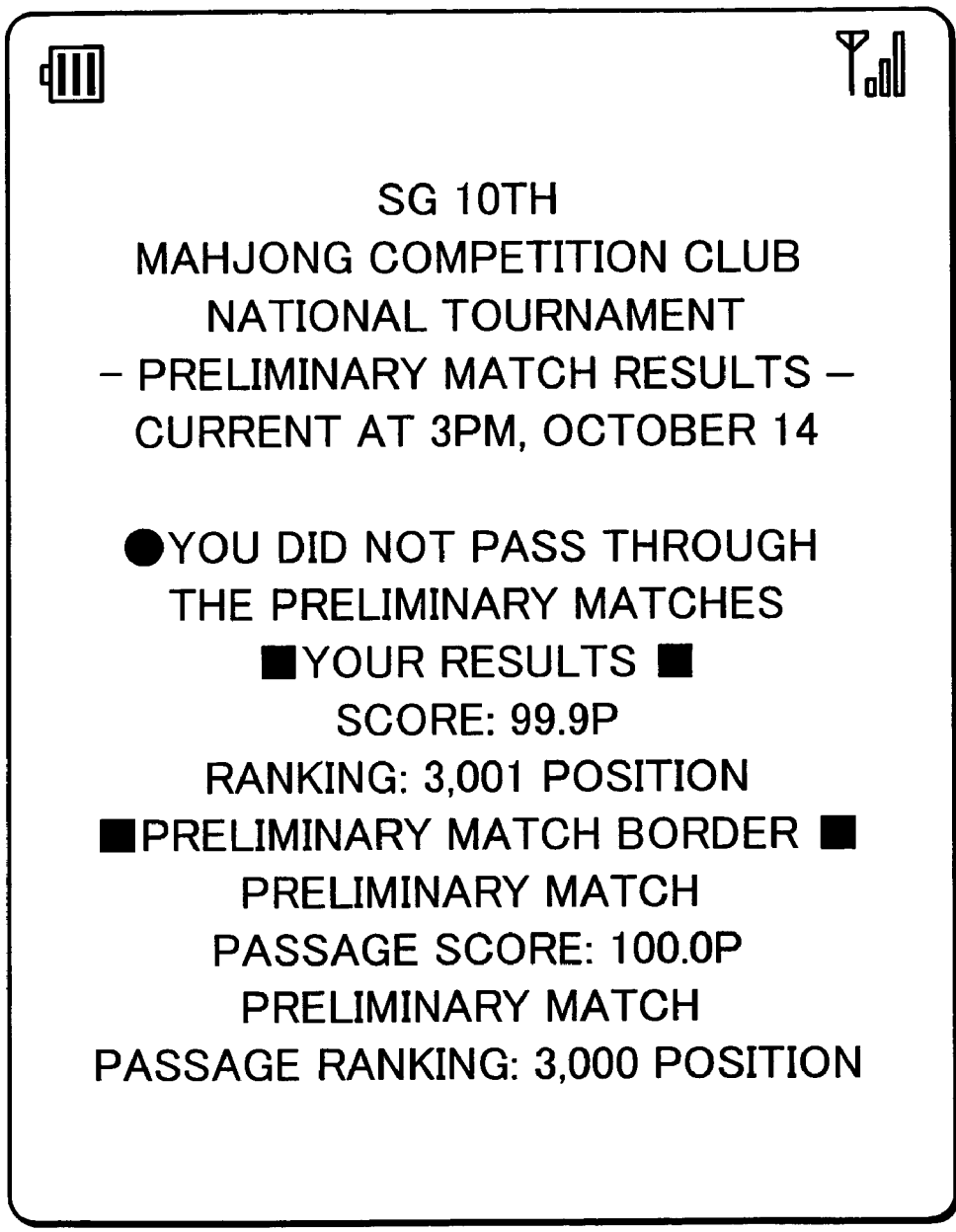
FIG. 20 is a diagram showing an example screen of a mobile phone during a preliminary match.
Figure 21:
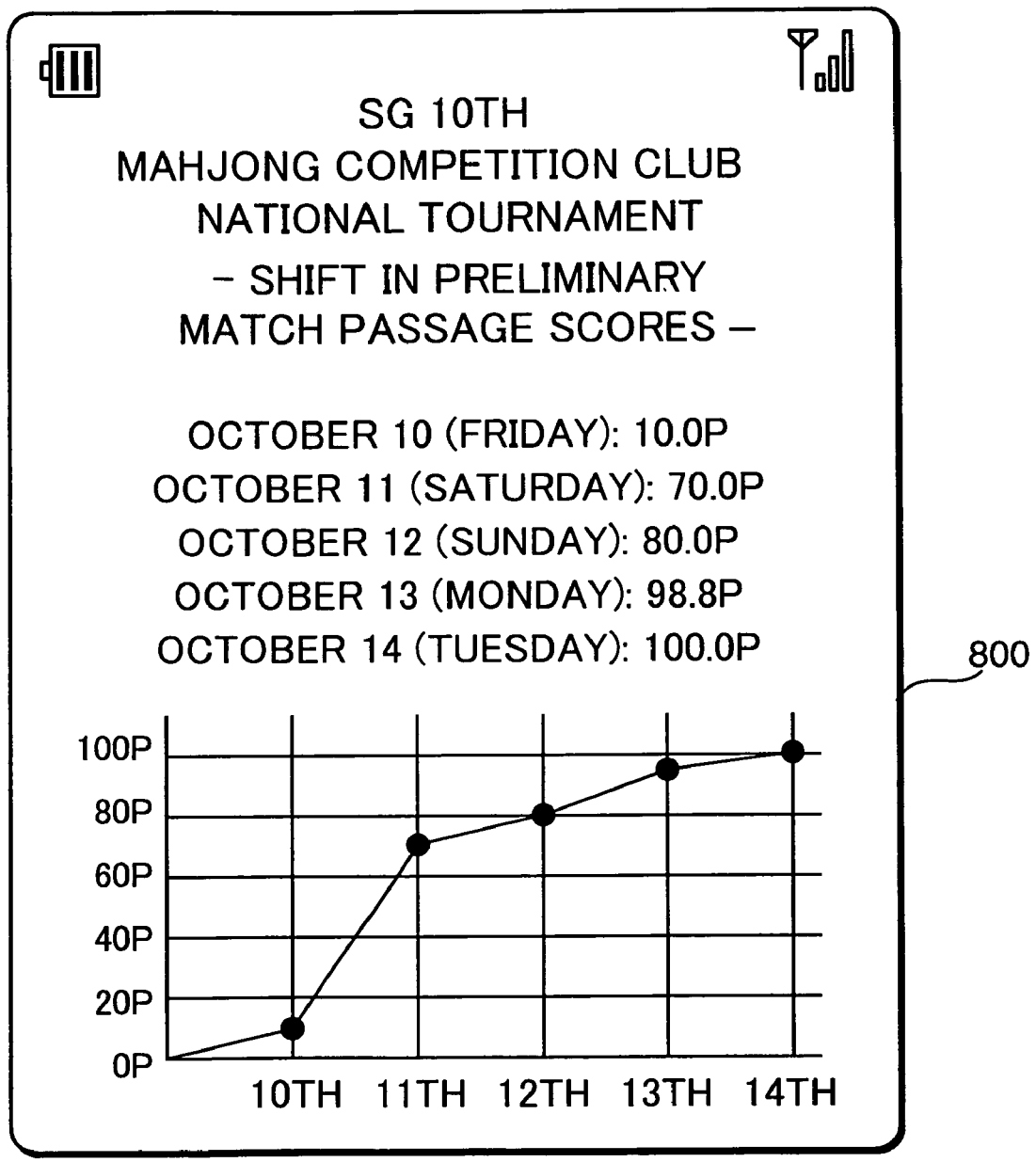
FIG. 21 is a diagram showing an example screen of a mobile phone during a preliminary match.
Figure 22:
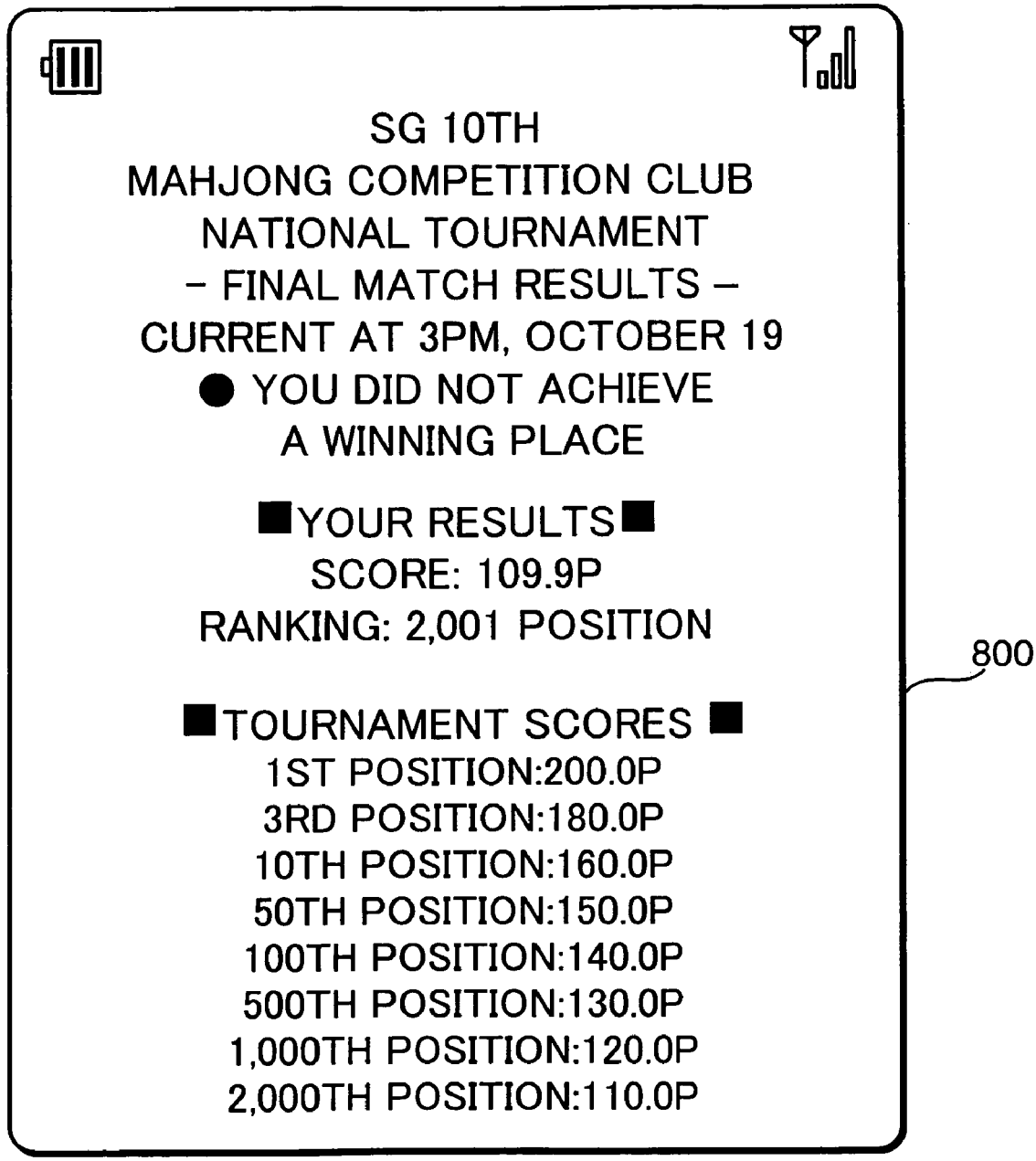
FIG. 22 is a diagram showing an example screen of a mobile phone during a final match.
Figure 23:
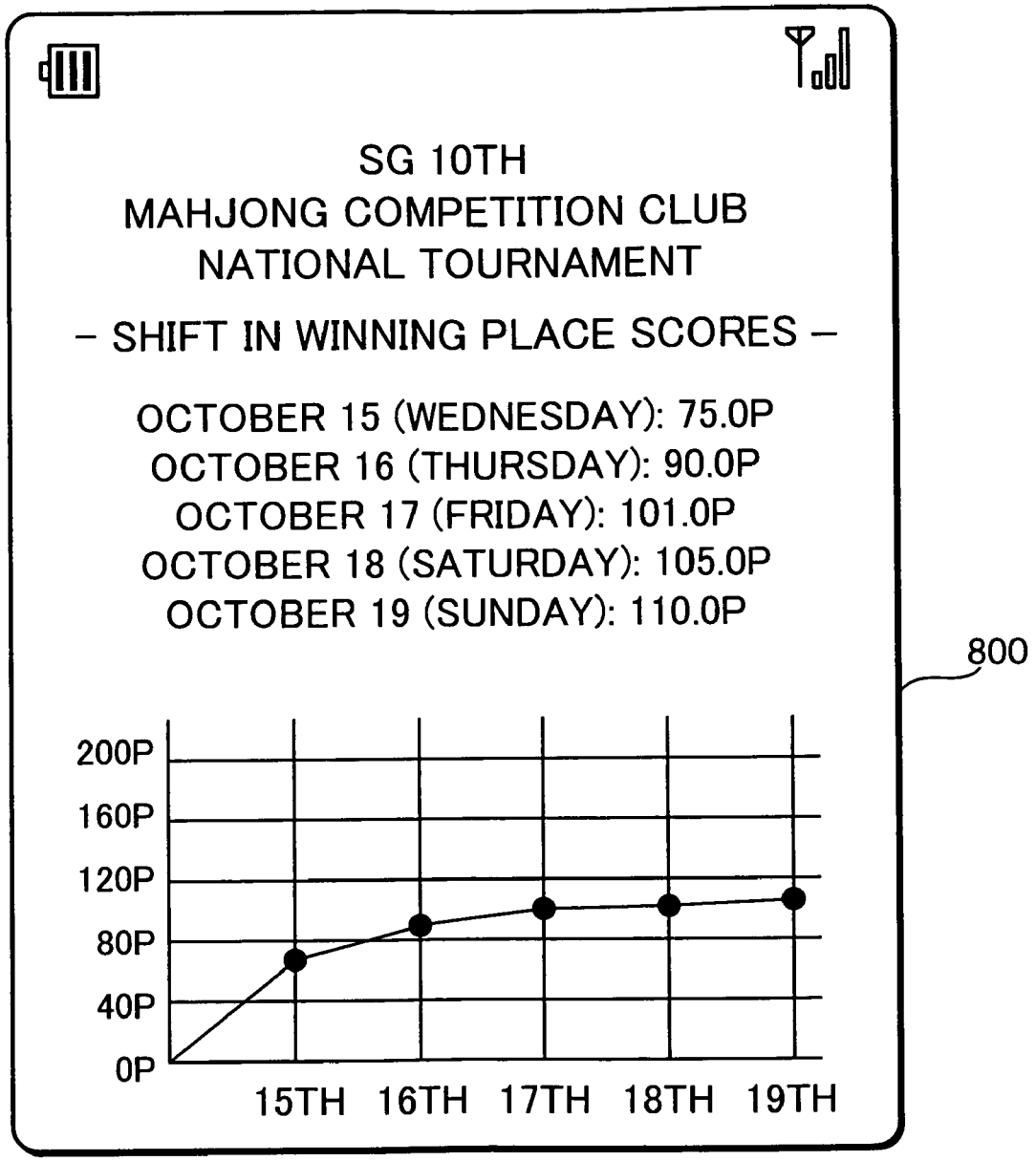
FIG. 23 is a diagram showing an example screen of a mobile phone during a final match.

FIG. 20 through FIG. 23 are diagrams showing example screens of a mobile phone. FIG. 20 and FIG. 21 are screens corresponding to processing of step ST125 at a time of preliminary matches. In FIG. 21 is a diagram showing shifts in the preliminary match passage scores and "14th" indicates the current date. That is, by showing shifts in the scores over the past five days, it becomes possible to estimate a score (an estimate score) for the 15th. Furthermore, from the shifts in past scores and using a predetermined estimation function, for example, a logarithmic function, if the function is specified using a least-square method for example, it is possible to estimate the preliminary match passage score for the following day. FIG. 22 and FIG. 23 are screens corresponding to processing of step ST125 at a time of final matches. FIG. 23 shows shifts in the winning place scores corresponding to FIG. 21, and the current date is the 19th.

It should be noted that the present invention can employ other embodiments below.

(1) The present invention was described using an example of a mahjong game, but there is no particular limitation to the type of game. For example, this also includes soccer games, baseball games, shogi games, music games, and quiz.

(2) Furthermore, rights and benefits in relation to the game includes all forms by which differentiation can be achieved with other players based on game results, and in addition to a qualification to pass through the preliminary matches of the tournament, these may include the conferment of entitlements to real or virtual goods, conferment of designation entitlements in the game, and discount entitlements for game fees or the like.

(3) In the present embodiment, information to the effect that the player's ranking has crossed over a predetermined standard (clear) condition was sent to the mobile phone 4 of the relevant player when this happened, but the present invention is also applicable to forms such as the following in which, within a predetermined period or from results of a predetermined number of games, rights and benefits in relation to the game are conferred. For example, the client terminal device 1 may be further provided with an item assigning unit that virtually assigns items of a predetermined numerical amount to the player, an item transferring unit that transfers between players a predetermined numerical amount of items virtually held by the players based on a determination result by a result processing unit 161c, and a grade determining unit that assigns a grade (corresponding to a class) that indicates a level of strength in a game for a predetermined number of players in order of greater quantities of items virtually held by the players, and furthermore, in an embodiment provided with a designation parameter calculation unit that calculates a designation parameter indicating a feature of the player in the game based on history data stored in a history storage unit, and a designation assigning unit that assigns a player designation within a game to a predetermined number of players in order of highest parameters based on calculated designation parameters, when the standard condition is crossed over, information to that effect may be sent to the mobile phone 4 of the relevant player.

(4) In the foregoing embodiments, an example was shown in which game evaluations were totaled, but in the present invention it is also possible to perform a relative comparison of a single game evaluation without totaling game evaluations.

As described above, a novel game system has a plurality of game terminal devices each having an operation unit operated by a player, a server, in which by exchanging via a network operational information that is inputted in use of the operation units by players, a game is advanced among the plurality of game terminals in response to the operational information, and game evaluation calculation means that carries out game evaluations of each player, wherein the server has: address storage means for storing a communication address, obtained from each player, of a communication device owned by each player; game result storage means for storing a game evaluation of each player; standard condition setting means for setting a relative standard condition for each player relating to game evaluation for assigning a right and benefit in relation to a game; monitoring means for monitoring whether or not the game evaluation of each player has crossed over the standard condition; and notification means for sending, to a player for whom the monitoring means has determined according to monitoring that the game evaluation has crossed over the standard condition, information to that effect to a communication device of that player.

Furthermore, a recording medium on which a novel game management program is recorded such that, by exchanging via a network operational information that is inputted via operation units from players, a game is advanced among a plurality of game terminals in response to the operational information, and a game result of each player in each game is managed by a server, and the server is caused to function as: an address storage means for storing a communication address obtained from each player of a communication device owned by each player, game evaluation calculation means for carrying out a game evaluation of each player from a game result of each game of each player, game result storage means for storing a game evaluation of each player, standard condition setting means for setting relative standard conditions among players relating to game evaluations for assigning rights in relation to a game, monitoring means for monitoring whether or not a game evaluation of each player has crossed over the standard condition, and notification means for sending, to a player for whom the monitoring means has determined according to monitoring that the game evaluation has crossed over the standard condition, information to that effect to a communication device of that player.

Furthermore, a novel game management method is such that, by exchanging via a network operational information that is inputted via operation units from players, a game is advanced among a plurality of game terminals in response to the operational information, and a game result of each player in each game is managed by a server, and includes: storing a communication address, obtained from each player, of a communication device owned by each player by address storage means; carrying out a game evaluation of each player from a game result of each game of each player by game evaluation calculation means; storing a game evaluation of each player by game result storage means; setting a relative standard condition for each player relating to the game evaluation for assigning a right and benefit in relation to a game by standard condition setting means; monitoring whether or not the game evaluation of each player has crossed over the standard condition by monitoring means; and sending, to a player for whom the monitoring means has determined according to monitoring that the game evaluation has crossed over the standard condition, information to that effect to a communication device of that player by notification means.

With this configuration, operational information that is inputted via the operation units from players is exchanged via a network, and a game is advanced among the plurality of game terminals in response to the operational information. And game results for each player in the game are managed by the server for each game. With this game system, a communication address obtained from each player of a communication device owned by each player is stored using address storage means. Then each time a game is carried out, game evaluations are obtained for each player from the game results of each game for each player by the game evaluation calculation means, and when required these are added to the previous game values, that is, totaled, and stored in game result storage means as game evaluations totaled for each player. Furthermore, relative standard conditions among players relating to game evaluations for assigning rights in relation to a game, which are preset, are set using standard condition setting means, and a border ranking is set by which the preliminary match can be passed for a game tournament constituted by preliminary matches and final matches for example, and whether or not the totaled game evaluation of each player has crossed over the standard condition is continuously monitored using monitoring means, that is, even while one person is not playing a game, the game evaluation of that person can change relatively according to game results of other players. Then, with respect to a player for whom the totaled game evaluation according to the continuous monitoring by the monitoring means has been determined to cross over the standard condition, information is sent to that effect by the notification means to a communication device of that player provided with at least a display unit, for example, a mobile phone or a personal computer. Then, information to that effect is displayed on the display unit of the communication device.

In this way, since notifications are not carried out each time a variation occurs, a load is not added to the traffic of the system and above-necessary countermeasures are not required as in conventional techniques. Furthermore, by carrying out notifications only when the standard condition has been crossed over, it is possible and easy to effectively give to the player a momentum and intensity to play the game. It should be noted that, in the present embodiment, the totaled game evaluations crossing over the standard condition may refer to both or only one of a case where the totaled game evaluations have transitioned from a state in which the standard condition is being satisfied to a state in which they are not being satisfied, and also a case where the standard condition transitions from a state of not being satisfied to a state of being satisfied. For example, this may be only a case where the totaled game evaluations transition from a state in which the standard condition is being satisfied to a state in which it is not satisfied. In this case, an opportunity is automatically given to the player to play a further game to achieve an increased ranking so as to satisfy the standard condition. In this way, since notifications are not carried out each time a variation in ranking or the like occurs, a load is not added to the traffic of the system and above-necessary countermeasures are not required as in conventional techniques. Furthermore, by carrying out notifications only when the standard condition has been crossed over, it is possible and easy to effectively give to the player a momentum and intensity to play the game.

It is preferable that the standard condition is a predetermined ranking among players in the game evaluation, and the monitoring means executes a sorting process on the totaled game evaluations of the players and converts the evaluations to the ranking. With this configuration, the standard condition is a ranking, and therefore the monitoring means performs conversion for the player to a ranking among all players. Rankings can change relatively in relation to other players, and therefore receiving information when the border ranking has been crossed over, which is the standard condition, allows extremely beneficial information to be provided to a player while not playing the game.

It is preferable that the monitoring means carries out the monitoring operation with respect to a player having not less than a preset number of game results. With this configuration, cases can be eliminated such as where a high game evaluation is achieved by chance with a small number of games, and therefore the real capabilities of each player in operating the game can be more easily reflected.

It is preferable that the game evaluations are executed on all games that have been carried out within a predetermined period. With this configuration, in a case where a game period is set, all games carried out in that period are targeted for evaluation, and therefore the real capabilities of the players can be even more easily reflected.

It is preferable that game evaluations are executed on a predetermined number of games. With this configuration, if a preset number of games has been exceeded, a predetermined number of games therein can be targeted for evaluation, and players can enjoy the game slowly and at ease to a certain extent. Rules can be employed in advance to decide the games to be targeted, for example, automatic selection in order from games in which high evaluations were achieved is possible, and random selection is also possible. In this way, if a preset number of games has been exceeded, a predetermined number of games therein can be targeted for evaluation, and therefore since not all games are targeted, it is supposed that the games can be carried out pleasurably, and a more exciting game environment can be provided.

It is preferable that the game are executed on a predetermined consecutive number of games. With this configuration, a predetermined consecutive number of games are targeted, and therefore unbalances caused by larger and smaller number of games can be eliminated as soon as possible. A rule can be employed to select the first consecutive games, for example, for a series of games in which a predetermined number of consecutive games are extracted from among all games, a series of games may be selected having a highest totaled game evaluation. In this way, a predetermined consecutive number of games are targeted, and therefore unbalances due to larger and smaller number of games can be eliminated as soon as possible.

It is preferable that the notification means issues notification of the standard condition, and the totaled game evaluations and ranking of a player concerned. With this configuration, the standard condition as well as the totaled game evaluations and ranking of the relevant player are displayed on the communication device of the player, and therefore a player who has received this information can easily confirm an extent to which a condition of the crossing over has occurred.

It is preferable that the monitoring means continuously monitors game evaluations corresponding to the standard condition, and calculates a monitoring result and an anticipated game evaluation at a time point of completion of the predetermined period after a current elapsed period, and the notification means issues notification of the standard condition, and at least one of the totaled game evaluations and ranking of the player concerned, and the anticipated game evaluation. With this configuration, an anticipated game evaluation is calculated at a time point of completion of the predetermined period from the current elapsed period and monitoring results, and notification is given of the anticipated game evaluation also, and therefore a player who has received notification can more easily arrange scheduling so as to clear the standard condition. For example, in a case where the standard condition is determined as the top 100 positions, when the totaled game evaluation of the player is a score of 50 when the 100th position is crossed over (during a predetermined period), it is anticipated that the final (at the time of completion of the predetermined period) 100 positions, that is, the standard condition, will rise to a score of 60. In this way, an anticipated game evaluation is calculated at a time point of completion of the predetermined period from the current elapsed period and monitoring results, and notification is given of the anticipated game evaluation also, and therefore a player who has received notification can more easily arrange scheduling so as to clear the standard condition.

It is preferable that display control means is further provided for displaying on the monitor of the game terminal device the game evaluation of a player during a game and the standard condition by receiving an instruction from the operation member. With this configuration, a player is always able to view his own status during a game by making a request himself. Accordingly, scheduling is easier for subsequent games.

It is preferable that the game system is further provided with game tournament management means for managing a game tournament in which with predetermined period being set, participation from a plurality of players is received, wherein the game tournament is constituted by a preliminary match tournament and a final match tournament, the right and benefit in relation to the game are a qualification of advancing from the preliminary match tournament to the final match tournament, and the game tournament management means determines, when receiving entrance to the final match tournament after completion of the preliminary match tournament, a presence/absence of the qualification to permit or deny the reception. With this configuration, a ranking from the top and a percentage from a top position (essentially a ranking) are conceivable as qualifications for advancing from the preliminary match tournament to the final match tournament. And when a standard condition for acquiring the qualification is crossed over, information to that effect is notified to the player, thereby enabling the player to devise a strategy for advancing to the final matches.

INDUSTRIAL APPLICABILITY

A game system, game management program, and game management method for a game system according to the present invention is capable of effectively notifying players of a game status and is capable of reducing server load.

The invention claimed is:

1. A game system comprises a plurality of game terminal devices each having an operation unit operated by a player, a server that exchanges operational information inputted in use of the operation unit by players via a network to advance a game among the plurality of game terminal devices in response to the operational information, and a game evaluation calculation unit that carries out a game evaluation of each player, wherein the server has;
an address storage unit that stores a communication address, obtained from each player, of a communication device owned by each player;
a game result storage unit that stores a game evaluation of each player;
a standard condition setting unit that sets a relative standard condition for each player relating to the game evaluation for assigning a right and benefit in relation to a game;
a monitoring unit that monitors whether or not the game evaluation of each player has crossed over the standard condition;
a notification unit that separately sends information to a communication device of a player in response to a determination made by the monitoring unit that the game evaluation of the player has crossed over the standard condition, said information being that the player has crossed over the standard condition;
a processor that schedules tournament games and non-tournament games during the tournament;
wherein for a first player determined to have exceeded the standard condition, the processor enters the first player in a tournament game of said tournament with a second player that also has exceeded the standard condition;
wherein for a third player determined not to have exceeded the standard condition, the processor enters the third player in a game that is not part of the tournament; and
wherein for the third player, whom after one or more non-tournament games comes to exceed the standard condition, the processor enters the third player in a tournament game of said tournament with a fourth player that also has exceeded the standard condition.

2. A recording medium which stores a game management program, in which by exchanging via a network operational information that is inputted in use of operation units by players, a game is advanced among a plurality of game terminals in response to the operational information, and a game result of each player in each game is managed by a server, the server is caused to function as:
an address storage unit that stores a communication address, obtained from each player, of a communication device owned by each player,
a game evaluation calculation unit that carries out a game evaluation of each player from a game result of each game of each player,
a game result storage unit that stores a game evaluation of each player,
a standard condition setting unit that sets a relative standard condition for each player relating to the game evaluation for assigning a right and benefit in relation to a game,
a monitoring unit that monitors whether or not the game evaluation of each player has crossed over the standard condition,
a notification unit that separately sends information to a communication device of a player in response to a determination made by the monitoring unit that the game evaluation of the player has crossed over the standard condition, said information being that the player has crossed over the standard condition;
a scheduling unit that schedules tournament games and non-tournament games during the tournament;
wherein for a first player determined to have exceeded the standard condition, the scheduling unit enters the first player in a tournament game of said tournament with a second player that also has exceeded the standard condition;
wherein for a third player determined not to have exceeded the standard condition, the scheduling unit enters the third player in a game that is not part of the tournament; and
wherein for the third player, whom after one or more non-tournament games comes to exceed the standard condition, the scheduling unit enters the third player in a tournament game of said tournament with a fourth player that also has exceeded the standard condition.

3. A game management method for a game system, in which by exchanging via a network operational information that is inputted via operation units from players, a game is advanced among a plurality of game terminals in response to the operational information, and a game result of each player in each game is managed by a server, the method comprising the steps of:
storing a communication address, obtained from each player, of a communication device owned by each player by an address storage unit;
carrying out a game evaluation of each player from a game result of each game of each player by a game evaluation calculation unit;
storing the game evaluation of each player by a game result storage unit;
setting a relative standard condition for each player relating to the game evaluation for assigning a right and benefit in relation to a game by a standard condition setting unit;
monitoring whether or not the game evaluation of each player has crossed over the standard condition by a monitoring unit;
separately sending information to a communication device of a player in response to a determination made during said monitoring that the game evaluation of the player has crossed over the standard condition, said information being that the player has crossed over the standard condition;
for a first player determined to have exceeded the standard condition, entering the first player in a tournament game of said tournament with a second player that also has exceeded the standard condition;

for a third player determined not to have exceeded the standard condition, entering the third player in a game that is not part of the tournament; and for the third player, whom after one or more subsequent non-tournament games comes to exceed the standard condition, entering the third player in a tournament game of said tournament with a fourth player that also has exceeded the standard condition.

* * * * *